United States Patent
Nakata

(10) Patent No.: US 9,252,558 B2
(45) Date of Patent: Feb. 2, 2016

(54) OPTICAL AMPLIFIER

(71) Applicant: FUJITSU LIMITED, Kawasaki-shi, Kanagawa (JP)

(72) Inventor: Masao Nakata, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 29 days.

(21) Appl. No.: 14/027,663

(22) Filed: Sep. 16, 2013

(65) Prior Publication Data

US 2014/0146386 A1    May 29, 2014

(30) Foreign Application Priority Data

Nov. 26, 2012    (JP) .................................. 2012-257967

(51) Int. Cl.
| | | |
|---|---|---|
| *H01S 3/10* | (2006.01) | |
| *H01S 3/13* | (2006.01) | |
| *H04B 10/293* | (2013.01) | |
| *H01S 3/00* | (2006.01) | |
| H01S 3/067 | (2006.01) | |
| H01S 3/16 | (2006.01) | |
| H01S 3/0941 | (2006.01) | |

(52) U.S. Cl.
CPC ........... *H01S 3/10015* (2013.01); *H01S 3/0014* (2013.01); *H01S 3/1301* (2013.01); *H04B 10/293* (2013.01); *H01S 3/06754* (2013.01); *H01S 3/09415* (2013.01); *H01S 3/10069* (2013.01); *H01S 3/1608* (2013.01)

(58) Field of Classification Search
CPC .............. H01S 3/10015; H01S 3/1301; H01S 3/06754; H04B 10/293
USPC ......................... 359/341.42, 341.43
See application file for complete search history.

(56) References Cited

U.S. PATENT DOCUMENTS

| | | | | |
|---|---|---|---|---|
| 5,680,246 | A * | 10/1997 | Takahashi et al. | 359/341.43 |
| 5,966,237 | A * | 10/1999 | Sugaya et al. | 359/341.41 |
| 6,377,394 | B1 * | 4/2002 | Drake et al. | 359/341.41 |
| 6,975,449 | B1 * | 12/2005 | Mok et al. | 359/341.41 |
| 7,511,883 | B2 * | 3/2009 | Kawahara et al. | 359/341.41 |
| 2002/0149841 | A1 * | 10/2002 | Ohtani et al. | 359/341.1 |
| 2003/0231376 | A1 * | 12/2003 | Horachi et al. | 359/333 |
| 2004/0012842 | A1 * | 1/2004 | Hakomori et al. | 359/333 |
| 2004/0042063 | A1 | 3/2004 | Ohtani et al. | |
| 2004/0240044 | A1 * | 12/2004 | Park et al. | 359/341.41 |
| 2005/0248833 | A1 * | 11/2005 | Fourte et al. | 359/337.13 |
| 2007/0264014 | A1 * | 11/2007 | McClean et al. | 398/37 |
| 2008/0205460 | A1 | 8/2008 | Okaniwa et al. | |
| 2009/0116834 | A1 * | 5/2009 | Sugawa et al. | 398/6 |
| 2010/0134875 | A1 | 6/2010 | Mori | |

FOREIGN PATENT DOCUMENTS

| | | |
|---|---|---|
| JP | 2004-88376 | 3/2004 |
| JP | 2007-220977 | 8/2007 |
| WO | WO 2009-016695 A1 | 2/2009 |

* cited by examiner

*Primary Examiner* — Eric Bolda
(74) *Attorney, Agent, or Firm* — Staas & Halsey LLP

(57) ABSTRACT

There is provided an optical amplifier, which includes: an optical amplification medium; a pump light generator configured to generate pump light with a power corresponding to a set control value and supply the generated pump light to the optical amplification medium; a first controller including a level control circuit configured to generate the control value such that an output power of the optical amplification medium approaches a target power, and a limiter configured to limit a range of the control value in variable; and a latch circuit configured to set a specific control value to the pump light generator during a period in which the first controller is in a stop state.

10 Claims, 22 Drawing Sheets

OPTICAL AMPLIFIER

CROSS-REFERENCE TO RELATED APPLICATION

This application is based upon and claims the benefit of priority from the prior Japanese Patent Application No. 2012-257967 filed on Nov. 26, 2012, the entire contents of which are incorporated herein by reference.

FIELD

The embodiments discussed herein are related to an optical amplifier configured to amplify an optical signal using a pump light.

BACKGROUND

An optical amplifier used in an optical transmission system has a control circuit to control pump light power based on input power and/or output power. In recent years, the control circuit of the optical amplifier may have been realized using a field programmable gate array (FPGA).

The FPGA includes an updatable program and/or a reconfigurable logic component, and thus it is possible to change a function of the FPGA by rewriting the program or reconfiguring the logic component. Therefore, by updating or upgrading the FPGA, it is possible to adjust an operation, a performance, a characteristic, and/or the like of the optical amplifier. Note that "updating (upgrading)" includes updating (upgrading) a program of the FPGA, reconfiguring a logic component of the FPGA, and/or updating (upgrading) a parameter of the FPGA.

The updating of the FPGA may be requested when an optical transmission system is in operation. In this case, the optical amplifier is supposed to have a function (in-service software upgrade function) of performing a process of updating the FPGA while continuing the operation of amplifying an optical signal.

However, the FPGA that controls the optical amplifier is not capable of controlling pump light power when the FPGA is being subjected to the updating operation. Therefore, when the updating of the FPGA is performed, for example, a control value for controlling the pump light power is stored in a memory. During a period in which the updating of the FPGA is being performed, the pump light power is controlled based on the control value stored in the memory. When the updating of the FPGA is ended, the control value stored in the memory is provided to the FPGA. Thus, the FPGA acquires the control value used immediately before the updating of the FPGA is performed, and the FPGA restarts controlling the pump light power.

As a related technique, an optical amplifier has been proposed which is capable of controlling optical amplification and updating an FPGA without conflict. As another related technique, an optical amplifier has been proposed which is for use at a relay node in an optical transmission system and which is configured to amplify an optical signal and perform an automatic level control (ALC) of output power. A method has also been proposed to suppress an error of a signal caused by an abrupt change in gain.

Descriptions of the above-described or other related techniques may be found, for example, in Japanese Laid-open Patent Publication No. 2007-220977, International Publication Pamphlet No. WO 2009/016695, Japanese Laid-open Patent Publication No. 2004-88376.

SUMMARY

According to an aspect of the invention, an optical amplifier includes: an optical amplification medium; a pump light generator configured to generate pump light with a power corresponding to a set control value and supply the generated pump light to the optical amplification medium; a first controller including a level control circuit configured to generate the control value such that an output power of the optical amplification medium approaches a target power, and a limiter configured to limit a range of the control value in variable; and a latch circuit configured to set a specific control value to the pump light generator during a period in which the first controller is in a stop state.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

There is a possibility that a change in a characteristic of an optical transmission line occurs when the updating of the FPGA is being performed. In this case, the pump light power of the optical amplifier that is optimum in a situation after the completion of the updating may be different from the power of pump light actually supplied before the updating. If the control value employed before the updating is provided as the control value of pump light power immediately after the updating, a large difference may occur, immediately after the updating is ended, between the provided control value and a target control value depending on a change in characteristic or the like of the transmission line. As a result, in the operation immediately after the updating, the pump light power of the optical amplifier may abruptly change in response to a change in control value to the target control value from the control value used before the execution of the updating.

For example, if an increase in loss of an optical transmission line occurs when uploading of a FPGA is being performed, the result is an increase in target control value after the execution of the uploading, which results in an abrupt increase in pump light power. Thus, a surge of pump light occurs immediately after the end of the updating of the FPGA. Such a surge of pump light may change power of an optical signal output from the optical amplifier. As a result, for example, a reduction in optical signal-to-noise ratio may occur, or the optical signal may go out of a dynamic range of a receiver, which may result in an increase in bit error rate.

Such a surge of pump light may occur not only when updating of an FPGA of an optical amplifier is performed, but may occur in other situations. For example, when a control circuit of pump light power is temporarily stopped when the optical amplifier is in operation, a surge of pump light may occur.

A description is given below as to an optical amplifier configured to be capable of suppressing a change in output power of an optical signal.

Operation of Optical Amplifier and Updating of FPGA

Figure 1:
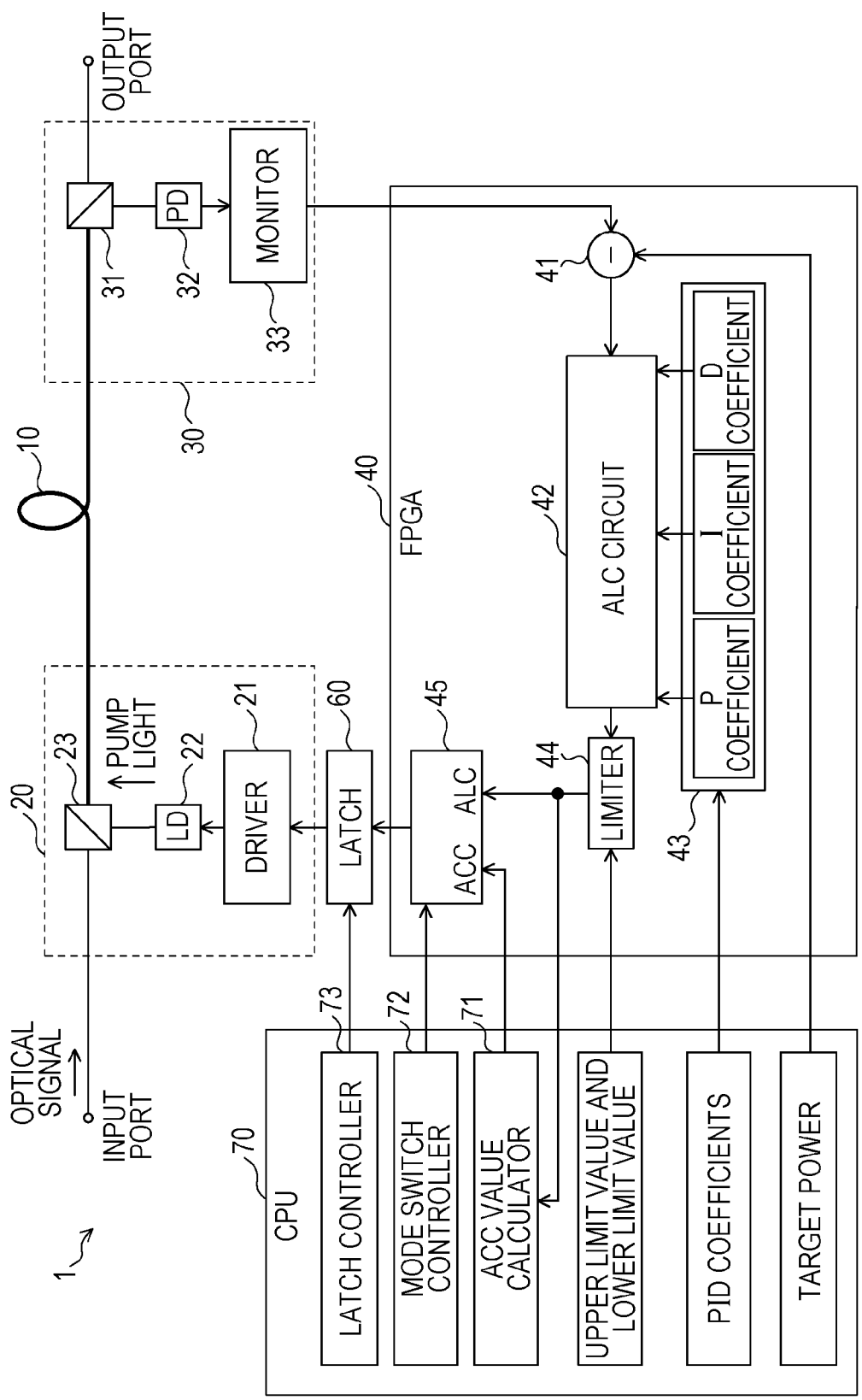
FIG. 1 is a block diagram illustrating an example of a configuration of an optical amplifier.

FIG. 1 illustrates an example of a configuration of an optical amplifier. As illustrated in FIG. 1, the optical amplifier 1 includes an erbium-doped fiber (EDF) 10, a pump light generator 20, an output power detector 30, an FPGA 40, a latch circuit 60, and a CPU 70.

The optical amplifier 1 may be used, for example, in an optical transmission system. In this case, the optical amplifier 1 may amplify an optical signal in the optical transmission system. The optical signal may be a wavelength-division multiplexing (WDM) signal. The pump light generator 20 is configured to generate pump light with power corresponding to a given control value and supply the generated pump light to the EDF 10. To achieve this function, the pump light generator 20 includes a driver 21, a laser diode (LD) 22, and a coupler 23. The driver 21 provides a current corresponding to a control value given by the FPGA 40 to the laser diode 22 thereby driving the laser diode 22. In response to be driven by the driver 21, the laser diode 22 generates light with a particular wavelength. The output light from the laser diode 22 is used as pump light. That is, the laser diode 22 is capable of generating pump light with power corresponding to the control value. The coupler 23 directs pump light generated by the laser diode 22 to the EDF 10.

In a state in which the pump light is supplied to the EDF 10, the EDF 10 operates as an optical amplification medium. That is, the EDF 10 amplifies an input optical signal. The optical signal amplified by the EDF 10 is output via an output port.

The output power detector 30 includes a splitter 31, a photo detector (PD) 32, and a monitor 33. The splitter 31 splits the optical signal amplified by the EDF 10 and directs the split optical signal to the photo detector 32. The photo detector 32 converts the optical signal received from the splitter 31 into an electric signal. The monitor 33 monitors the output power of the optical amplifier 1 based on the electric signal output from the photo detector 32.

The FPGA 40 operates as a controller that controls the pump light. More specifically, the FPGA 40 generates a control value such that the output power of the optical signal amplified by the optical amplifier 1 (that is, the output power of the EDF 10) has a value closer to target power. To generate the control value, the FPGA 40 includes a subtractor 41, an automatic level control (ALC) circuit 42, a coefficient memory 43, a limiter 44, and a selector 45. In the example illustrated in FIG. 1, the FPGA 40 controls the pump light power by ALC as a first controller.

The subtractor 41 calculates the difference between the output power detected by the output power detector 30 and the target power. Note that data indicating the target power is given to the FPGA 40 from the CPU 70.

The ALC circuit 42 calculates the control value to reduce the difference between the output power and the target power. The ALC circuit 42 may calculate the control value using proportional-integral-differential (PID) control. In this case, a proportional coefficient (hereafter referred as a P coefficient), a coefficient of an integral term (hereinafter referred to as an I coefficient), and a coefficient of a derivative term (hereinafter referred to as a D coefficient) are given from the CPU 70 to the FPGA 40 and stored in the coefficient memory 43. The ALC circuit 42 acquires the P coefficient, the I coefficient, and the D coefficient from the coefficient memory 43 and calculates the control value that leads to a reduction in the difference. The ALC circuit 42 may generate the control value at predetermined time intervals.

The limiter 44 limits a range of the control value generated by the ALC circuit 42. An upper limit value and a lower limit value of the range to which the control value is limited are given by the CPU 70. The upper limit value represents, for example, a value of a current corresponding to a maximum power of the laser diode 22. For example, let it be assumed that the maximum power of the laser diode 22 is 400 mW, and light of 400 mW is obtained when a driving current is 1000 mA. In this case, the upper limit value is given as 1000 mA. On the other hand, the lower limit value represents a value of the current corresponding to a minimum power of the laser diode 22. As an example, the lower limit value may be zero.

The selector 45 selects an ALC control value or an automatic current control (ACC) control value according to a selection command given from the CPU 70. The ALC value is a control value generated by the ALC circuit 42. As for the ALC control value, as described above, the range of the driving current of the laser diode 22 is limited by the limiter 44. The ACC value is given from the CPU 70. Hereinafter, the ALC value or the ACC value selected by the selector 45 will also be referred to simply as a "control value".

The latch circuit 60 is capable of holding the control value under the control of the CPU 70. The control value held by the latch circuit 60 is given to the pump light generator 20. That is, in a state in which the control value is held by the latch circuit 60, the driver 21 drives the laser diode 22 with a current specified by the control value.

The CPU 70 gives data indicating the target power to the subtractor 41 of the FPGA 40. The CPU 70 also gives the P coefficient, the I coefficient, and the D coefficient to the FPGA 40. Furthermore, the CPU 70 gives the upper limit value and the lower limit value defining the range of the control value to the limiter 44 of the FPGA 40. Note that the CPU 70 reads out the P coefficient, the I coefficient, the D coefficient, the upper limit value, and the lower limit value from a memory (not illustrated) and gives these values to the FPGA 40. Also note that the target power may be given from, for example, a controller (not illustrated) disposed outside the optical amplifier and configured to control the optical amplifier, and the CPU 70 may give this target power to the FPGA 40.

The CPU 70 includes an ACC value calculator 71, a mode switch controller 72, and a latch controller 73. When the FPGA 40 is updated, the ACC value calculator 71 calculates the ACC value based on the control value generated by the ALC circuit 42. The ACC value calculator 71 gives the calculated ACC value to the selector 45. The mode switch controller 72 gives the selector 45 a selection command to select the ALC value or the ACC value. The latch controller 73 controls an operation of the latch circuit 60.

The optical amplifier 1 amplifies the input optical signal as described below. The subtractor 41 calculates the difference between the output power and the target power. The ALC circuit 42 generates the control value to reduce the difference by the PID operation. The CPU 70 gives the selector 45 the selection command to select the ALC value. Thus, the control value generated by the ALC circuit 42 is given to the pump light generator 20. The pump light generator 20 generates pump light with power corresponding to the control value generated by the ALC circuit 42. As a result, the output power of the optical amplifier 1 is controlled to be equal to the target power. In this situation, the range of the control value generated by the ALC circuit 42 is limited by the limiter 44, and thus the pump light power is limited to be equal to or lower than the maximum power of the laser diode 22.

In the optical amplifier 1 configured in the above-described manner, the FPGA 40 is updated under the control of the CPU 70. For example, the CPU 70 may rewrite a calculation formula of the PID operation performed by the ALC circuit 42. Furthermore, the CPU 70 may change the P coefficient, the I coefficient, and the D coefficient used by the ALC circuit 42.

When the FPGA 40 is being updated, the FPGA 40 is stopped. That is, when the FPGA 40 is in a state in which the FPGA 40 is being updated, the FPGA 40 does not generate the control value. However, it is desirable that the optical amplifier 1 is capable of performing the operation of amplifying the optical signal even during the period in which the FPGA 40 is being updated. Thus, the optical amplifier 1 generates pump light even when the FPGA 40 is being updated.

Figure 2:
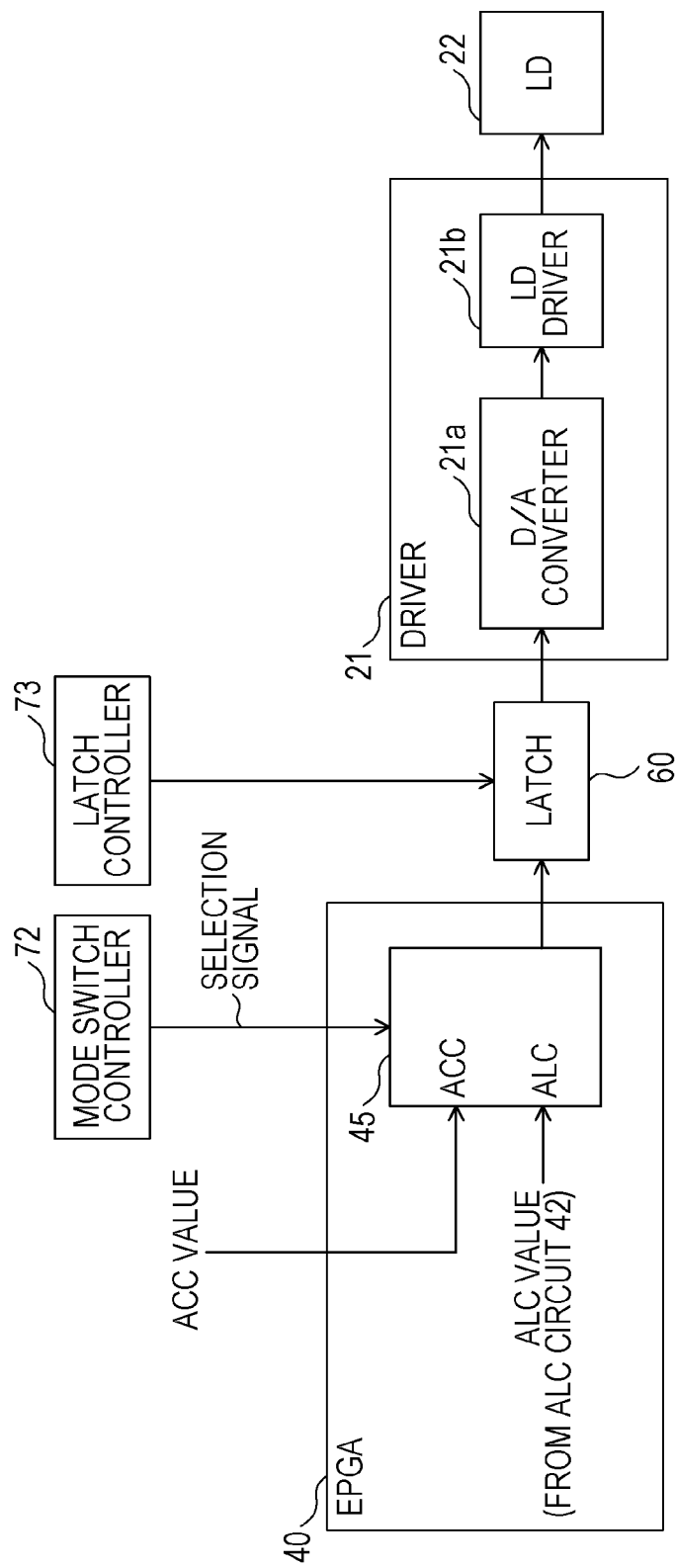
FIG. 2 is a block diagram illustrating an example of a circuit configured to latch a control value.

FIG. 2 illustrates an example of circuit configured to latch the control value. The selector 45 is input with the ALC value and the ACC value. The ALC value is, as described above, a control value generated by the ALC circuit 42. Immediately before the updating of the FPGA 40 is started, the CPU 70 switches the control mode from the ALC mode to the ACC mode. In the ACC mode, the CPU 70 generates the ACC value based on the control value generated by the ALC circuit 42. Furthermore, the CPU 70 gives a selection signal to the selector 45 to select the ACC value. According to the selection signal, the selector 45 selects the ACC value and outputs it.

The driver 21 includes a D/A converter 21a and an LD driver 21b. The D/A converter 21a converts a given control value into an analog signal. The LD driver 21b drives the laser diode 22 with a current corresponding to the analog signal output from the D/A converter 21a. Thus, when the updating of the FPGA 40 is started, a state is achieved in which the pump light is generated with power corresponding to the ACC value.

Under the control of the CPU 70, the latch circuit 60 hods the ACC value until the updating of the FPGA 40 is ended. Therefore, during the period until the updating of the FPGA 40 is ended, the pump light generator 20 continues to generate the pump light with power corresponding to the ACC value. That is, during the period in which the updating of the FPGA 40 is being performed, the pump light power is maintained at a value corresponding to the ACC value.

When the updating of the FPGA 40 is ended, the ALC circuit 42 restarts the operation of generating the control value based on the output power. The CPU 70 controls the latch circuit 60 to release the latched value. Furthermore, the CPU 70 returns the control mode from the ACC mode to the ALC mode. That is, the CPU 70 gives a selection signal to the selector 45 to select the ALC value. As a result, the control value generated by the ALC circuit 42 is given to the pump light generator 20. In the operation after that, the optical amplifier 1 amplifies the optical signal while controlling the pump light power in the ALC mode.

In the optical amplifier 1, as described above, even in the state in which the FPGA 40 that controls the pump light power is temporarily stopped, the amplifying operation is continued to maintain the particular output power. However, if the loss of an optical fiber of a transmission line changes during the updating of the FPGA 40, this may cause a large change in output power to occur immediately after the operation of the FPGA 40 is restarted.

Figure 3:
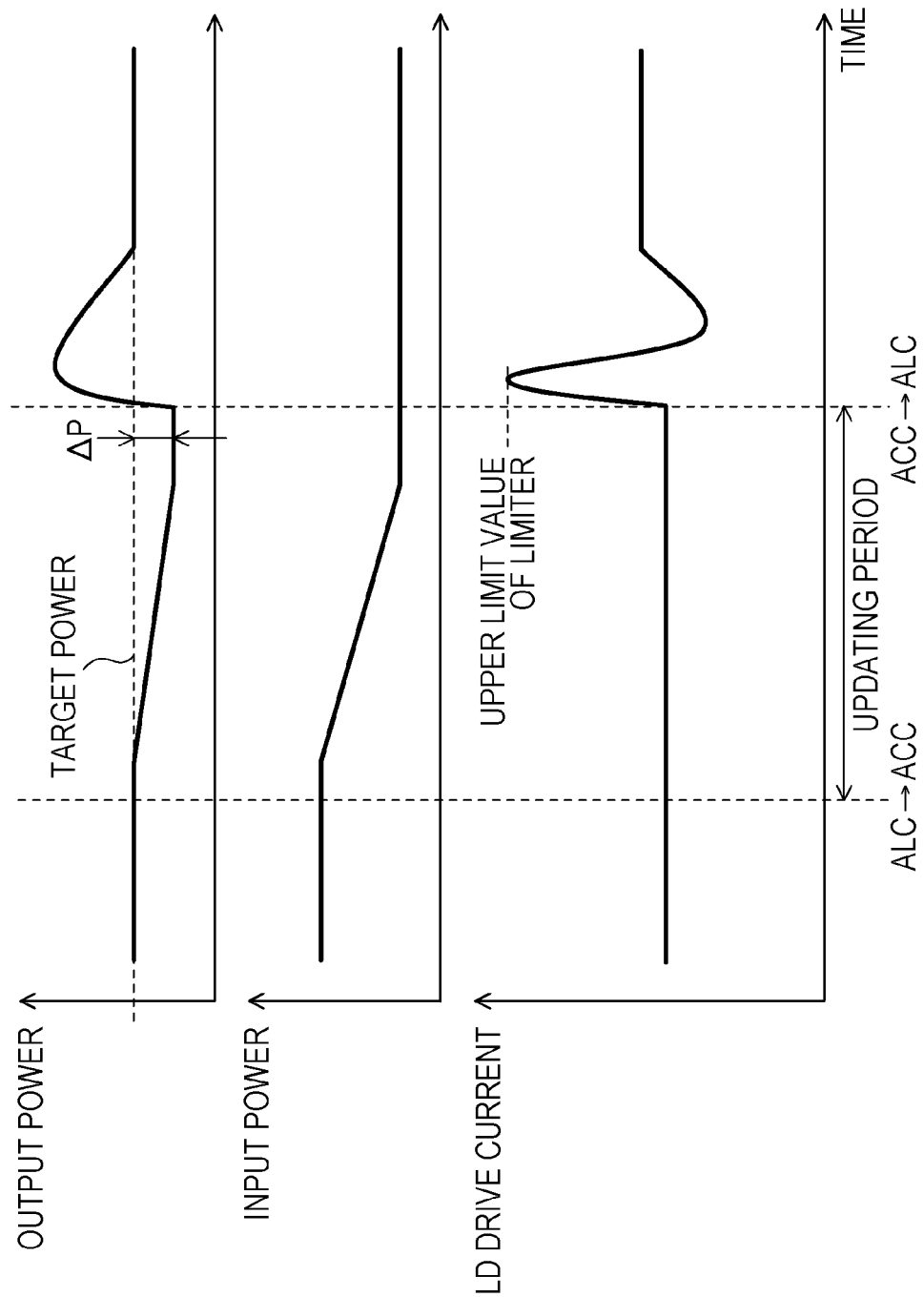
FIG. 3 is a diagram illustrating a transient change in pump light power and output power immediately after updating of an FPGA is performed.

FIG. 3 illustrates behavior of pump light power and output power immediately after updating of the FPGA 40 is ended. In the example illustrated in FIG. 3, it is assumed that an increase in loss of the optical fiber of the transmission line occurs in the middle of the updating of the FPGA 40, and this results in a reduction in input power.

As described above, when the updating of the FPGA 40 is started, the operation mode of the optical amplifier 1 is switched from the ALC mode to the ACC mode. In the ACC mode, the ACC value is given as the control value applied to the pump light generator 20, and thus the control value is not changed in the in the ACC mode. Therefore, in the period in which the FPGA 40 is updated, the pump light power does not change and thus the gain of the optical amplifier 1 also substantially does not change. Therefore, if a reduction in input power occurs in the middle of the updating of the FPGA 40, then correspondingly a reduction in output power occurs. As a result, at the end of the updating process, a difference ΔP occurs between the target power and the output power. Note that in this example, it is assumed that the target power is maintained at a particular value without being changed.

When the FPGA 40 restarts the operation of controlling the pump light power, the operation mode of the optical amplifier 1 is returned from the ACC mode to the ALC mode. In response, the ALC circuit 42 generates a control value to reduce the difference ΔP. As a result, an abrupt change occurs in pump light power controlled by the control value. In particular, when the P coefficient, the I coefficient, and the D coefficient in the ALC control are large, the pump light power has a large transient change. As a result, a large surge appears in the output light of the optical amplifier 1. Note that to achieve high trackability in the ALC control, it is desirable that the P coefficient, the I coefficient, and the D coefficient are set to be large.

Figure 4:
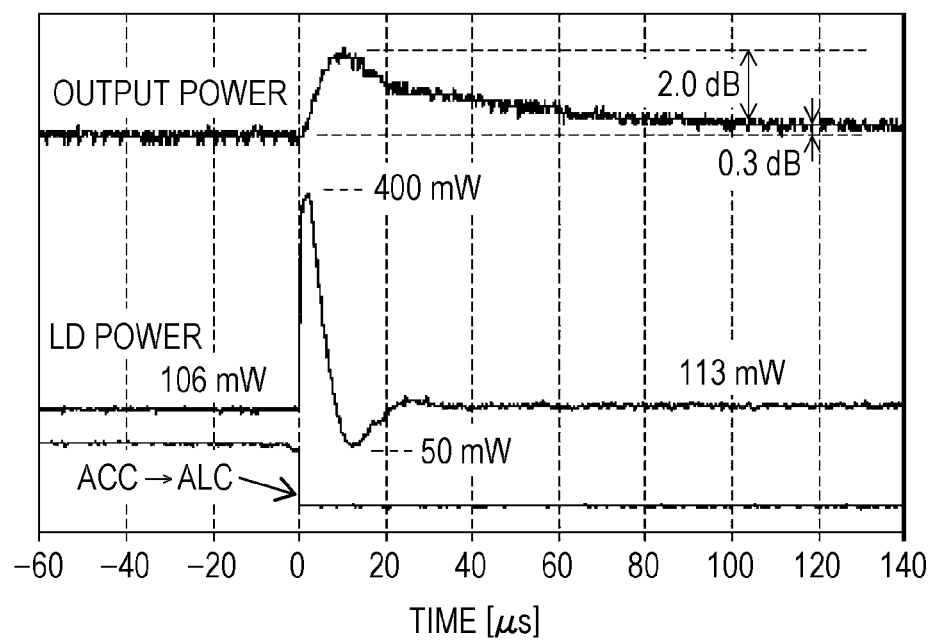
FIG. 4 is a diagram illustrating an example of a measurement result of a transient change illustrated in FIG. 3.

FIG. 4 illustrates an example of a measurement result of a transient change illustrated in FIG. 3. In FIG. 4, updating of the FPGA 40 is ended at time 0. During a period in which the updating of the FPGA 40 is being performed, the pump light power is maintain at a particular value (106 mW in this specific example). When the updating process is ended, the ALC circuit 42 increases the pump light power to reduce the difference ΔP illustrated in FIG. 3 to zero. In the situation, when the difference ΔP is large, an abrupt and large increase occurs in the pump light power. In the example illustrated in FIG. 4, the pump light power temporarily increases to 400 mW, which is the upper limit value controlled by the limiter 44. The temporary increase in pump light power causes the output power to change by about 2 dB. Thereafter, the difference between the output power and the target power gradually decreases, and the pump light power converges.

As described above, if a change in input power occurs when the FPGA 40 is in the state in which the FPGA 40 temporarily does not provide the function of controlling the pump light power, a large change in output power may occur when the operation of the FPGA 40 is restarted. Such a large change in output power of the optical amplifier 1 may result in a reduction in optical signal-to-noise ratio or may cause the optical signal amplified by the optical amplifier 1 to go out of a dynamic range of a receiver. As a result, the receiver may have an increase in bit error rate. Therefore, in a case where the control circuit (the FPGA 40 in the example illustrated in FIG. 1) that controls pump light power is capable of being updated when the optical transmission system is in operation, it is desirable that the optical amplifier has a function of suppressing a change in output power or a surge in output light that may occur immediately after the end of updating.

First Embodiment

Figure 5:
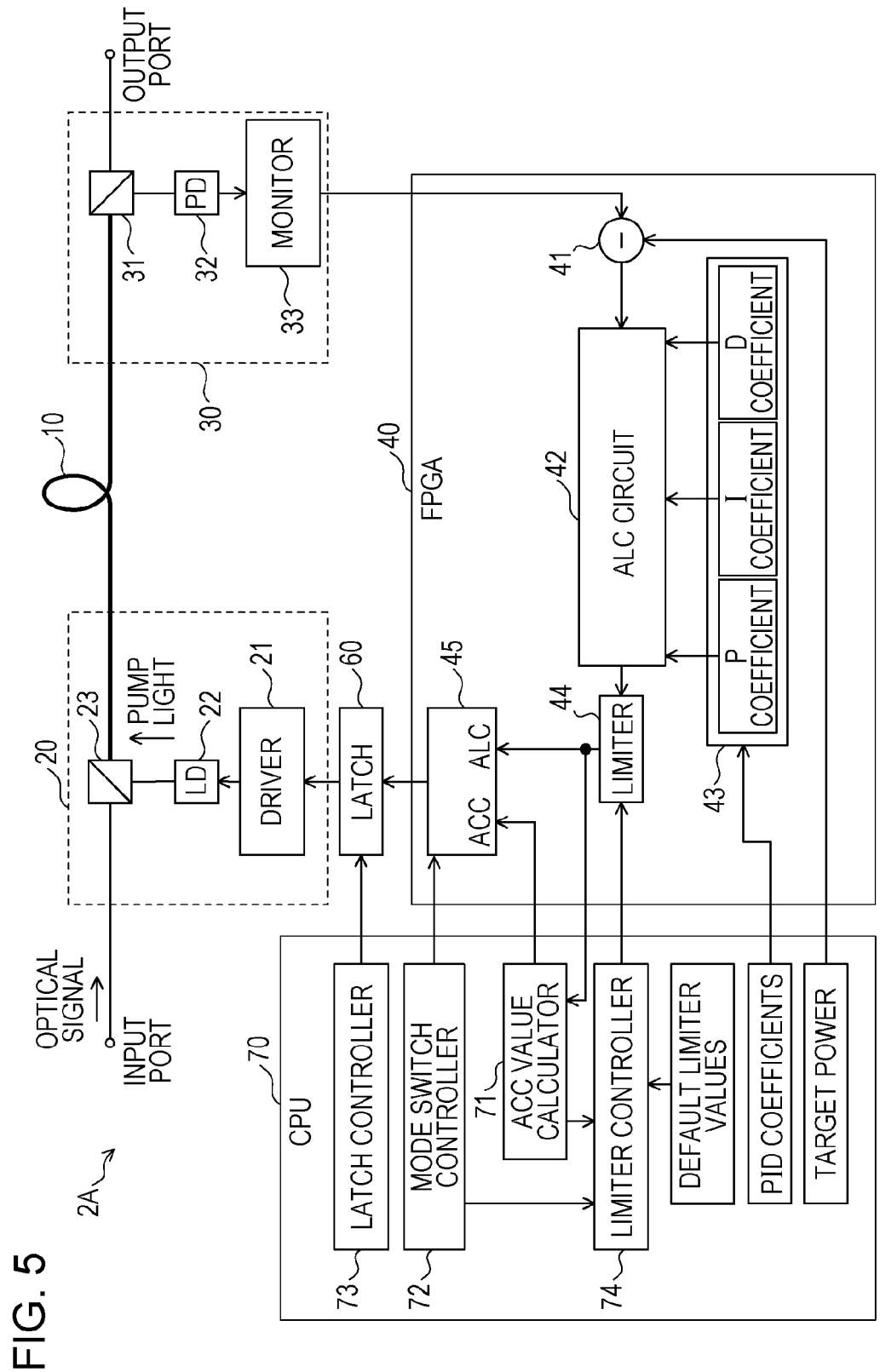
FIG. 5 is a block diagram illustrating a configuration of an optical amplifier according to an embodiment.

FIG. 5 illustrates a configuration of an optical amplifier according to a first embodiment. In the first embodiment, as illustrated in FIG. 5, the optical amplifier 2A includes an EDF 10, a pump light generator 20, an output power detector 30, an FPGA 40, a latch circuit 60, and a CPU 70. Note that the EDF 10, the pump light generator 20, the output power detector 30, and the latch circuit 60 in the optical amplifier 2A illustrated in FIG. 5 are substantially the same as those in the optical amplifier 1 illustrated in FIG. 1. Therefore, a further description of the EDF 10, the pump light generator 20, the output power detector 30, and the latch circuit 60 is omitted.

The FPGA 40 includes, as illustrated in FIG. 5, a subtractor 41, an ALC circuit 42, a coefficient memory 43, a limiter 44, and a selector 45. That is, the configuration of the FPGA 40 of the optical amplifier 2A according to the first embodiment is substantially the same as that of the FPGA 40 illustrated in FIG. 1 as a first controller. However, in the optical amplifier 2A according to the first embodiment, as will be described in further detail below, an upper limit value and a lower limit value of a range of the control value limited by the limiter 44 are variable.

The CPU 70 gives data indicating target power to the subtractor 41 of the FPGA 40. The CPU 70 also gives a P coefficient, an I coefficient, and a D coefficient to the FPGA 40. In the optical amplifier 2A, the target power, the P coefficient, the I coefficient, and the D coefficient are respectively set to particular values that are maintained without being changed. The operations of these units in the CPU 70 are the same between FIG. 1 and FIG. 5.

The CPU 70 includes an ACC value calculator 71, a mode switch controller 72, a latch controller 73, and a limiter controller 74. When the FPGA 40 is updated, the ACC value calculator 71 calculates an ACC value based on a control value generated by the ALC circuit 42 (that is, a control value output from the limiter 44). For example, the average value of a plurality of control values generated by the ALC circuit 42 is employed as the ACC value. The ACC value calculator 71 gives the resultant ACC value to the selector 45 and the limiter controller 74. The mode switch controller 72 gives a selection command to the selector 45 to select the ALC value or the ACC value. The latch controller 73 controls the operation of the latch circuit 60.

The limiter controller 74 acquires default limiter values from a memory (not illustrated). The default limiter values include a default upper limit value and a default lower limit value specified previously. The default upper limit value indicates, for example, a value of a current corresponding to maximum power of the laser diode 22. As an example, let it be assumed that the maximum power of the laser diode 22 is 400 mW, and light of 400 mW is achieved when a driving current is 1000 mA. In this case, the default upper limit value may be set to 1000 mA. On the other hand, the default lower limit value indicates, for example, a value of the current corresponding to minimum power of the laser diode 22. For example, the default lower limit value may be set to zero. The limiter controller 74 gives the default upper limit value and the default lower limit value to the limiter 44. When the optical amplifier 2A is operating in a normal mode, (that is, when the FPGA 40 is not in a state in which updating is being performed), the limiter 44 limits the control value using the default upper limit value and the default lower limit value.

In a case where in the FPGA 40 is in a state in which updating is being performed, the limiter controller 74 acquires the ACC value from the ACC value calculator 71. When the updating of the FPGA 40 is ended, the limiter controller 74 gives the ACC value as a provisional upper limit value and a provisional lower limit value to the limiter 44. In response, the limiter 44 limits the control value generated by the ALC circuit 42 such that the control value is "equal to or lower than the provisional upper limit value" and the control value is also "equal to or higher than the provisional lower limit value". In this specific situation, the provisional upper limit value and the provisional lower limit value are both equal to the ACC value. Therefore, the control value generated by the ALC circuit 42 is limited by the limiter 44 to the ACC value. That is, the control value output from the limiter 44 is equal to the ACC value.

Thereafter, the limiter controller 74 gradually increases the provisional upper limit value and gradually decreases the provisional lower limit value. As a result, the range of the control value limited by the limiter 44 gradually expands. If the provisional upper limit value reaches the default upper limit value, then thereafter the limiter controller 74 gives the default upper limit value to the limiter 44. Similarly, if the provisional lower limit value reaches the default lower limit value, then thereafter the limiter controller 74 gives the default lower limit value to the limiter 44.

Figure 6:
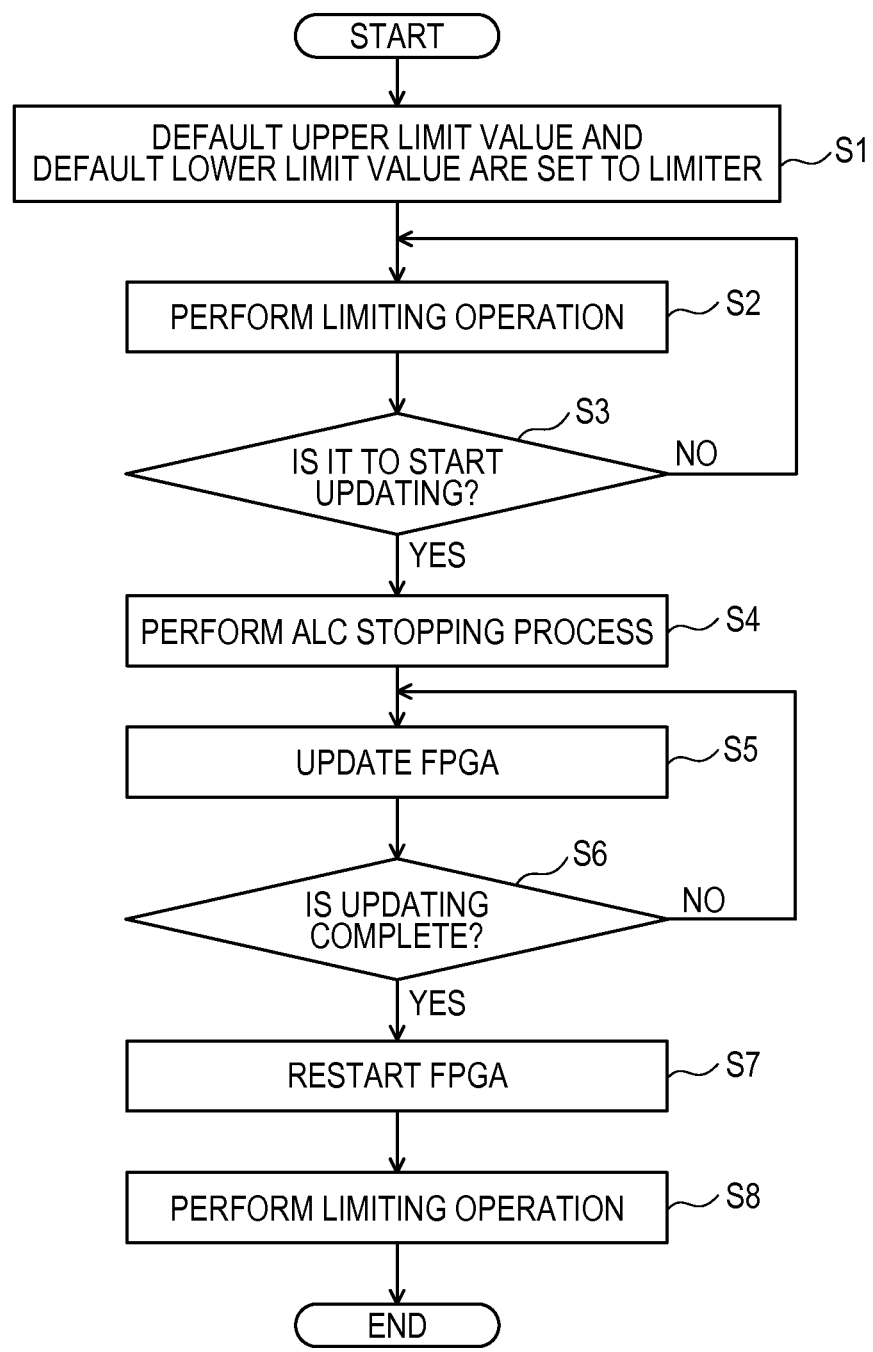
FIG. 6 is a flow chart illustrating an operation of an optical amplifier when an FPGA is updated.

FIG. 6 is a flow chart illustrating an operation of the optical amplifier when the FPGA 40 is updated. Note that this flow chart illustrates a procedure of generating the control value to control the pump light power.

S1: The limiter controller 74 gives the default upper limit value and the default lower limit value to the limiter 44. As described above, the default upper limit value indicates, for example, the value of the current corresponding to the maximum power of the laser diode 22, and the default lower limit value indicates, for example, the value of the current corresponding to the minimum power of the laser diode 22.

S2: The ALC circuit 42 generates a control value which leads to a reduction in the difference between the output power and the target power. The limiter 44 limits the control value such that the default lower limit value≤control value generated by the ALC circuit 42≤the default upper limit value. That is, when the control value generated by the ALC circuit 42 is higher than the default upper limit value, the limiter 44 outputs the default upper limit value as the control value. On the other hand, when the control value generated by the ALC circuit 42 is lower than the default lower limit value, the limiter 44 outputs the default lower limit value as the control value. As a result, the control value given to the pump light generator 20 falls within a range between the default lower limit value and the default upper limit value.

S3: The CPU 70 monitors an occurrence of a request for updating the FPGA 40. The update request is given to the optical amplifier 2A from, for example, an administrator or a user of the optical transmission system. In a case where the updating of the FPGA 40 is performed, the flow of the process proceeds to S4 in the flow chart.

S4: The CPU 70 performs the ALC stop process. The ALC stop process will be described in detail later.

S5 to S6: The CPU 70 updates the FPGA 40. During a period in which the FPGA 40 is being updated, the optical amplifier 2A generates pump light in the ACC mode. That is, the optical amplifier 2A generates the pump light according to the ACC value calculated in the ALC stop process. When the process of updating the FPGA 40 is ended, the flow of the process proceeds to S7 in the flow chart.

S7: The CPU 70 performs an FPGA restart process. The FPGA restart process will be described in detail later.

S8: The CPU 70 performs a limiter control process. The limiter control process will be described in detail later.

Figure 7:
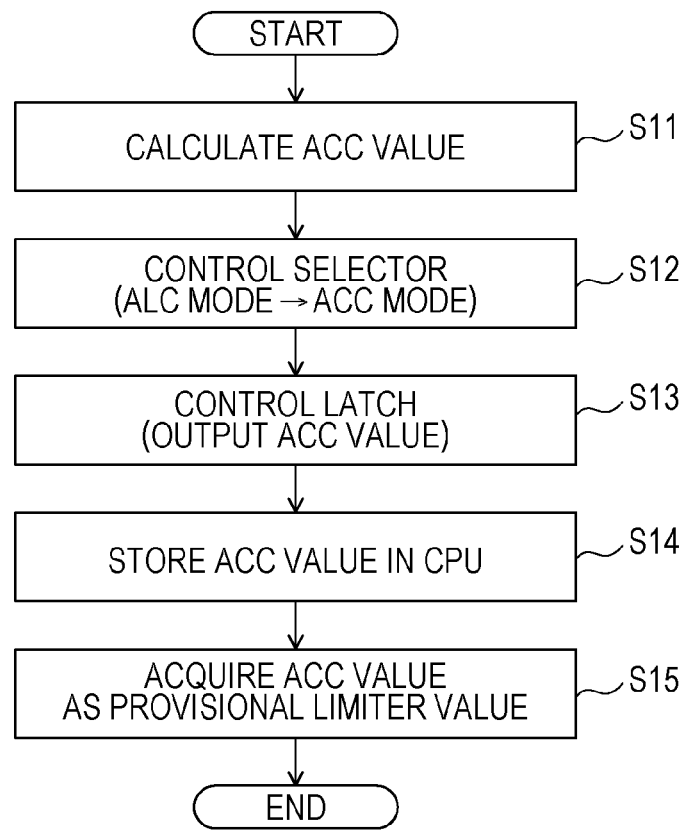
FIG. 7 is a flow chart illustrating a process of stopping an ALC operation.

FIG. 7 is a flow chart illustrating the ALC stop process. The ALC stop process is performed in S4 in the flow chart illustrated in FIG. 6. That is, the ALC stop process is performed when the updating of the FPGA 40 is started.

S11: The ACC value calculator 71 in the CPU 70 calculates the ACC value. For example, the ACC value calculator 71 calculates the average value of a plurality of control values (that is, a plurality of control values output from the limiter 44) to be output to the pump light generator 20, and the ACC value calculator 71 employs the resultant average value as the ACC value. The ACC value is given to the selector 45. Alternatively, one control value to be output to the pump light generator 20 may be employed as the ACC value.

S12: The mode switch controller 72 in the CPU 70 switches the operation mode of the optical amplifier 2A from the ALC mode to the ACC mode. For this purpose, the mode switch controller 72 gives a selection command to the selector 45 to select the ACC value. In response to the selection command, the selector 45 selects the ACC value calculated by the ACC value calculator 71 and outputs the selected ACC value to the latch circuit 60.

S13: The latch controller 73 in the CPU 70 controls the latch circuit 60 such that the latch circuit 60 latches the ACC value. The latch circuit 60 continuously outputs the latched ACC value to the pump light generator 20. Therefore, even when the FPGA 40 goes into a state in which the FPGA 40 generates no control value, the ACC value is given to the pump light generator 20 from the latch circuit 60, and thus the pump light power is maintained.

S14: The CPU 70 holds the ACC value described above. The ACC value held by the CPU 70 is used in the FPGA restart process after the updating of the FPGA 40 is ended.

S15: The limiter controller 74 of the CPU 70 acquires the ACC value as the provisional limiter value. Note that the acquired ACC value is used as the initial value of the provisional upper limit value and also as the initial value of the provisional lower limit value in the FPGA restart process after the updating of the FPGA 40 is ended.

In the ALC stop process, as described above, the selector 45 is controlled to select the ACC value, and this ACC value is latched by the latch circuit 60. The latch circuit 60 cuts off the electric connection between the FPGA 40 and the pump light generator 20. The pump light generator 20 generates pump light with power corresponding to the ACC value output from the latch circuit 60. Therefore, during the period in which the updating of the FPGA 40 is being per formed, the optical amplifier 2A amplifies an optical signal in an open loop mode such that the pump light power immediately before the updating of the FPGA 40 is maintained.

Figure 8:
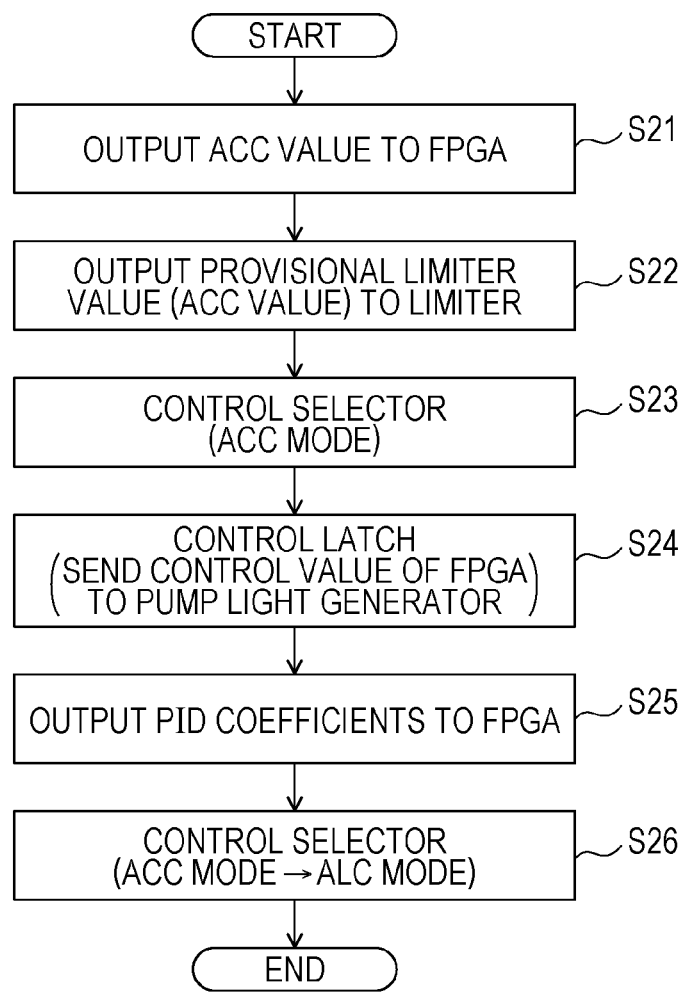
FIG. 8 is a flow chart illustrating a process of restarting an FPGA.

FIG. 8 is a flow chart illustrating the FPGA restart process. The FPGA restart process performs in S7 in the flow chart illustrated in FIG. 6. That is, the FPGA restart process is performed when the updating of the FPGA 40 is ended.

S21: The CPU 70 outputs the ACC value held in S14 to the FPGA 40. In the FPGA 40, this ACC value is given to the selector 45.

S22: The limiter controller 74 of the CPU 70 outputs the provisional limiter value to the limiter 44. Note that the ACC value acquired in S15 is used as the provisional limiter value. That is, in the limiter 44, the provisional upper limit value and the provisional lower limit value are both set to be equal to the ACC value.

S23: The mode switch controller 72 in the CPU 70 sets the operation mode of the optical amplifier 2A to the ACC mode. For this purpose, the mode switch controller 72 gives a selection command to the selector 45 to select the ACC value. In response to this selection command, the selector 45 selects the ACC value given in S21 and outputs it to the latch circuit 60.

S24: The latch controller 73 of the CPU 70 controls the latch circuit 60 to release the latched value. Thus, in the operation thereafter, a signal output from the FPGA 40 is passed through the latch circuit 60 and is given to the pump light generator 20. Note that at this point of time, the FPGA 40 outputs the ACC value. Therefore, the ACC value is given to the pump light generator 20.

S25: The CPU 70 outputs the P coefficient, the I coefficient, and the D coefficient, for use in the PID control, to the FPGA 40. These coefficients are stored in the coefficient memory 43. In the following process, the ALC circuit 42 generates the control value using these coefficients.

S26: The mode switch controller 72 in the CPU 70 returns the operation mode of the optical amplifier 2A form the ACC mode to the ALC mode. For this purpose, the mode switch controller 72 gives a selection command to the selector 45 to select the control value generated by the ALC circuit 42. In response to this selection command, the selector 45 selects the control value generated by the ALC circuit 42 and outputs it to the latch circuit 60. In the process thereafter, the optical amplifier 2A generates, using closed loop control, the control value to control the pump light power.

In the FPGA restart process, as described above, the provisional upper limit value and the provisional lower limit value are set in the limiter 44, and the control value generated by the ALC circuit 42 is limited by the limiter 44 within the range between the provisional upper limit value and the provisional lower limit value. However, the provisional upper limit value and the provisional lower limit value set in the limiter 44 are both equal to the ACC value. Therefore, regardless of the control value generated by the ALC circuit 42, the FPGA 40 outputs the ACC value as the control value that controls the pump light power.

Note that when the FPGA 40 is being updated, the pump light generator 20 is applied with the ACC value from the latch circuit 60. Immediately after the end of the updating of the FPGA 40, the control value is limited by the limiter 44 to the ACC value, and thus the ACC value is given to the pump light generator 20 from the FPGA 40. Thus, even if the loss of the optical fiber of the transmission line changes during the updating of the FPGA 40 and therefore a large difference occurs between the control value generated by the ALC circuit 42 and the ACC value, a large change in pump light power does not occur in the state immediately after the end of the updating of the FPGA 40. As a result, a change in output power of the optical amplifier 2A is also suppressed.

Figure 9:
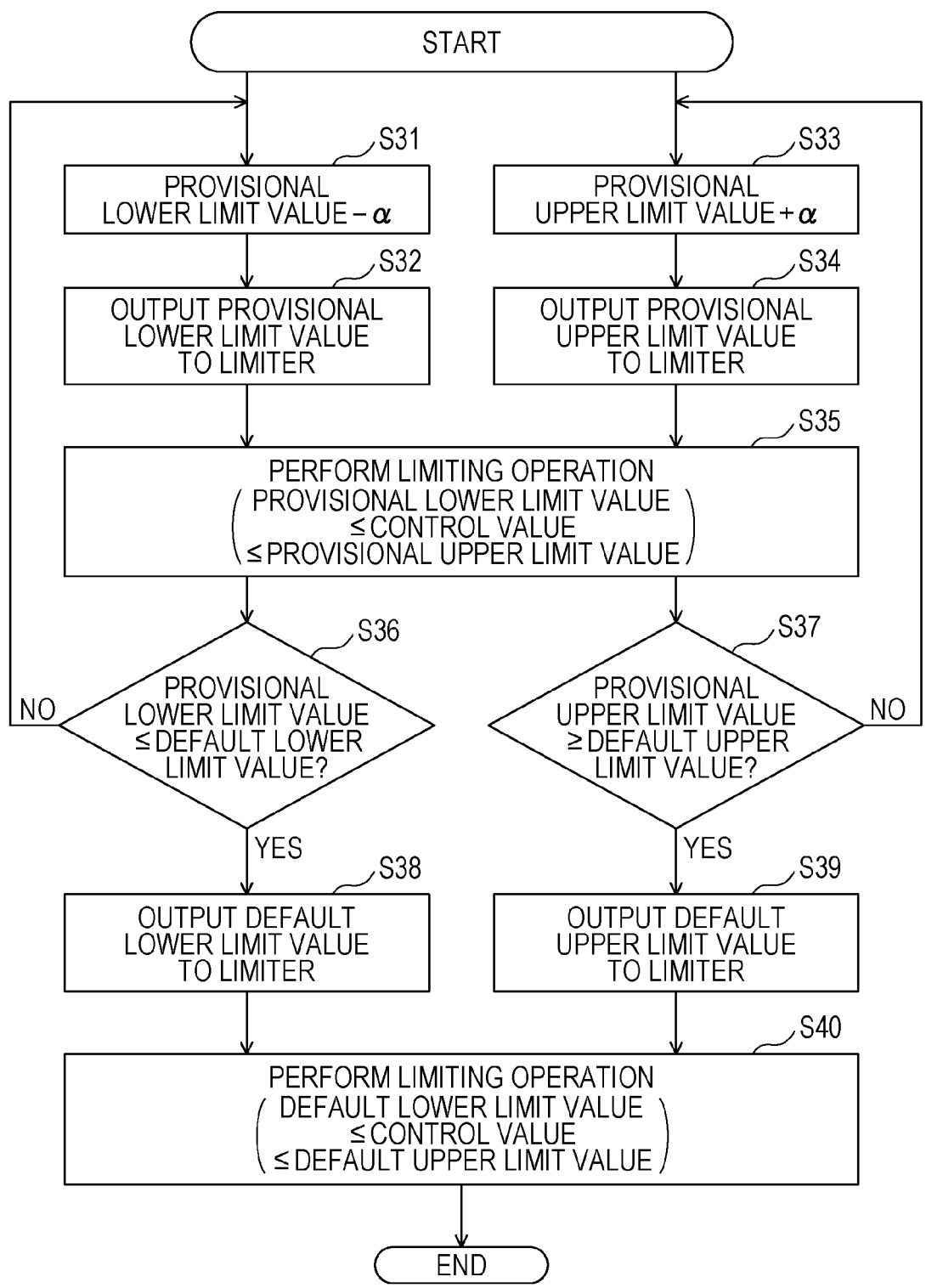
FIG. 9 is a flow chart illustrating a limiter control process.

FIG. 9 is a flow chart illustrating the limiter control process. The limiter control process is performed in S8 in the flow chart illustrated in FIG. 6. That is, the limiter control process is performed after the FPGA 40 is restarted.

S31: The limiter controller 74 in the CPU 70 subtracts α from the current provisional lower limit value and employs the resultant value as a new provisional lower limit value. Note that α is a positive value. That is, as a result of the operation in S31, the provisional lower limit value decreases by α. Note that at a point of time immediately after the updating of the FPGA 40 is ended, the provisional lower limit value is equal to the ACC value.

S32: The limiter controller 74 outputs the new provisional lower limit value calculated in S31 to the limiter 44.

S33: The limiter controller 74 adds α to the current provisional upper limit value and employs the resultant value as a new provisional upper limit value. That is, as a result of the operation in S33, the provisional upper limit value increases by α. Note that at a point of time immediately after the updating of the FPGA 40 is ended, the provisional upper limit value is equal to the ACC value.

S34: The limiter controller 71 gives outputs the new provisional upper limit value calculated in S33 to the limiter 44.

S35: The ALC circuit 42 generates a control value which leads to a reduction in the difference between the output power and the target power. The limiter 44 limits the control value such that the provisional lower limit value control value generated by the ALC circuit 42 the provisional upper limit value. That is, when the control value generated by the ALC circuit 42 is higher than the provisional upper limit value, the limiter 44 outputs the provisional upper limit value as the control value. On the other hand, when the control value generated by the ALC circuit 42 is lower than the provisional lower limit value, the limiter 44 outputs the provisional lower limit value as the control value. Therefore, the control value given to the pump light generator 20 falls within a range between the provisional lower limit value and the provisional upper limit value.

S36: The limiter controller 74 compares the default lower limit value with the provisional lower limit value newly set in S31. If the provisional lower limit value is greater than the default lower limit value, then the process associated with the limiter controller 74 returns to S31. On the other hand, if the provisional lower limit value is equal to or lower than the default lower limit value, then the process associated with the limiter controller 74 proceeds to S38.

S37: The limiter controller 74 compares the default upper limit value with the provisional upper limit value newly set in S33. If the provisional upper limit value is lower than the default upper limit value, then the process associated with the limiter controller 74 returns to S33. If the provisional upper limit value is equal to or higher than the default upper limit value, then the process associated with the limiter controller 74 proceeds to S39.

S38: This operation is performed when the provisional lower limit value is equal to or lower than the default lower limit value. In this case, the limiter controller 74 ends the process of renewing the provisional lower limit value, and outputs the default lower limit value to the limiter 44.

S39: This operation is performed when the provisional upper limit value is equal to or higher than the default upper limit value. In this case, the limiter controller 74 ends the process of renewing the provisional upper limit value, and outputs the default upper limit value to the limiter 44.

S40: The ALC circuit 42 generates a control value which leads to a reduction in the difference between the output power and the target power. The limiter 44 limits the control value such that the default lower limit value≤control value generated by the ALC circuit 42≤the default upper limit value. That is, when the control value generated by the ALC circuit 42 is higher than the default upper limit value, the limiter 44 outputs the default upper limit value as the control value. On the other hand, when the control value generated by the ALC circuit 42 is lower than the default lower limit value, the limiter 44 outputs the default lower limit value as the control value. Thus, the control value given to the pump light generator 20 falls within a range between the default lower limit value and the default upper limit value.

As described above, via the iteration of S31, S32, and S36, the provisional lower limit value gradually decreases from the ACC value to the default lower limit value. Similarly, via the iteration of S33, S34, and S37, the provisional upper limit value gradually increases from the ACC value to the default upper limit value. That is, after the FPGA 40 is restarted, the range of the control value for controlling the pump light power gradually expands. Note that there is no particular restriction on the period at which to change the provisional lower limit value and the provisional upper limit value to new values. For example, the period may be 1 millisecond.

For example, in a case where the ACC value is equal to 300 mA, the provisional lower limit value and the provisional upper limit value are both equal to 300 mA immediately after the FPGA 40 is restarted. Here let it be assumed by way of example that the incremental/decremental step size α is 20 mA. In this case, performing S31 and S33 causes the provisional lower limit value and the provisional upper limit value to be set to 280 mA and 320 mA, respectively. Performing S31 and S33 once again causes the provisional lower limit value and the provisional upper limit value to be set to 260 mA and 340 mA, respectively. Note that although in the example described above, the amount by which the provisional lower limit value is reduced at a time is equal to the amount by which the provisional upper limit value is increased at a time, the amount may be different between provisional lower limit value and the provisional upper limit value.

Performing S31, S32, and S36 to reduce the provisional lower limit value is ended when the provisional lower limit value becomes equal to or lower than the default lower limit value. Performing S33, S34, and S37 to reduce the provisional upper limit value is ended when the provisional upper limit value becomes equal to or higher than the provisional upper limit value. Note that the timing of ending the process of reducing the provisional lower limit value is not necessarily the same as the timing of ending the process of increasing the provisional upper limit value. For example, in a case where the ACC value, the default lower limit value, and the default upper limit value are 300 mA, 0 mA, and 1000 mA, respectively, the provisional lower limit value and the provisional upper limit value may be changed as follows. In this case, when the provisional upper limit value increases up to 600 mA, the provisional lower limit value becomes equal to 0 mA. Then, in S38, the lower limit value is set to the default lower limit value in the limiter 44. At this point of time, the provisional upper limit value is lower than the default upper limit value. Therefore, after the lower limit value is set to the default lower limit value in the limiter 44, the process in S33, S34, and S37 is further performed repeatedly to increase the provisional upper limit value until the provisional upper limit value reaches the default upper limit value.

In the method described above, when the FPGA 40 is being subjected to the updating process, pump light with power corresponding to the ACC value is generated. Immediately after the updating of the FPGA 40 is ended, pump light is generated so as to have power corresponding to the control value limited by the provisional lower limit value and the provisional upper limit value. Therefore, a fluctuation in pump light power is suppressed that may occur immediately after the control mode in which the pump light power is controlled is returned from the ACC mode to the ALC mode. Thereafter, when a predetermined time elapses, the upper limit value and the lower limit value of the limiter 44 respectively return to the default upper limit value and the default lower limit value, and thus the optical amplifier 2A is capable of amplifying an optical signal in the control mode (the closed loop control mode) used before the updating of the FPGA 40 is started.

Figure 10:
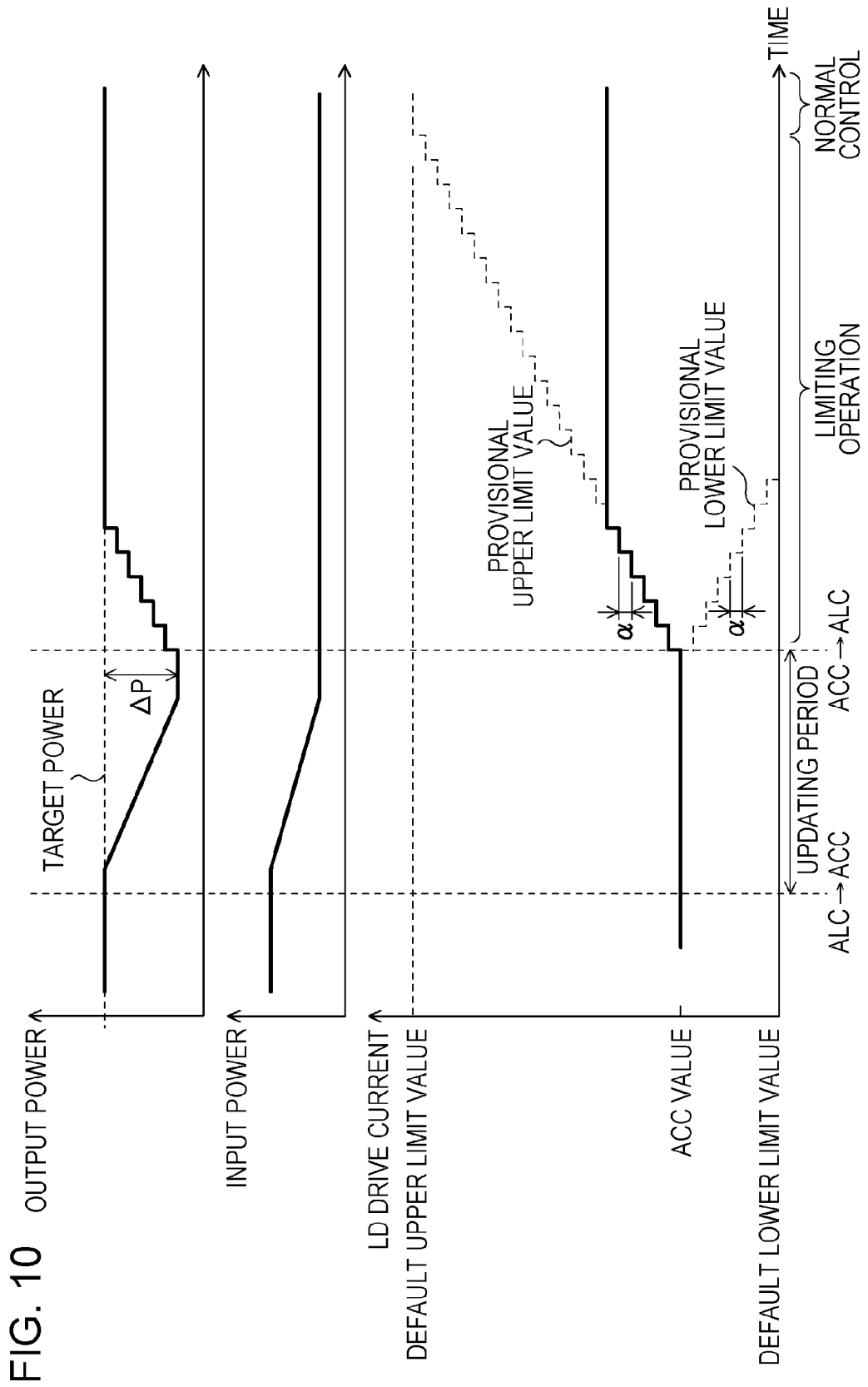
FIG. 10 is a diagram illustrating an example of an operation of an optical amplifier according to an embodiment.

FIG. 10 illustrates an example of an operation of the optical amplifier when the FPGA 40 is updated, according to the first embodiment. In the example illustrated in FIG. 10, as in the example illustrated in FIG. 3, it is assumed that an increase in loss of an optical fiber of a transmission line occurs in the middle of the updating of the FPGA 40, and thus a reduction in input power occurs.

As described above, when the updating of the FPGA 40 is started, the operation mode of the optical amplifier 2A is switched from the ALC mode to the ACC mode. In the ACC mode, the ACC value is given to the pump light generator 20. Therefore, in the period in which the FPGA 40 is updated, the pump light power is maintained at a particular value and thus the gain of the optical amplifier 2A is also substantially maintained at its particular value. Therefore, if a reduction in input power occurs in the middle of the updating of the FPGA 40, then correspondingly a reduction in output power occurs. As a result, at the end of the updating process, a difference ΔP occurs between the target power and the output power.

When the updating of the FPGA 40 is ended, then in the limiter 44, the provisional upper limit value and the provisional lower limit value are both set to be equal to the ACC value. That is, immediately after the updating of the FPGA 40 is ended, the control value applied to the pump light generator 20 from the FPGA 40 is equal to the ACC value.

Thereafter, the provisional upper limit value increases with a step size of α, the provisional lower limit value decreases with a step size of α. The provisional upper limit value and the provisional lower limit value may be changed to new values at intervals of, for example, 1 milliseconds. Thus, the range of the control value gradually expands. In the present example, immediately after the FPGA 40 is restarted, the output power of the optical amplifier 2A is lower than the target power by ΔP. As a result, the control value generated by the ALC circuit 42 is higher than the ACC value. In particular, when the difference ΔP is large, the control value generated by the ALC circuit 42 is higher than the ACC value by a large amount.

However, the control value generated by the ALC circuit 42 is limited by the limiter 44 to the provisional upper limit value. At a point of time immediately after the FPGA 40 is restated, the provisional upper limit value is only slightly higher than the ACC value. Therefore, the control value given to the pump light generator 20 is also only slightly higher than the ACC value. Thereafter, the provisional upper limit value gradually increases. As a result, the control value given to the pump light generator 20 also gradually increases. In the optical amplifier 2A according to the first embodiment, as described above, no abrupt increase in pump light power occurs in the state immediately after the FPGA 40 is restarted.

Figure 11:
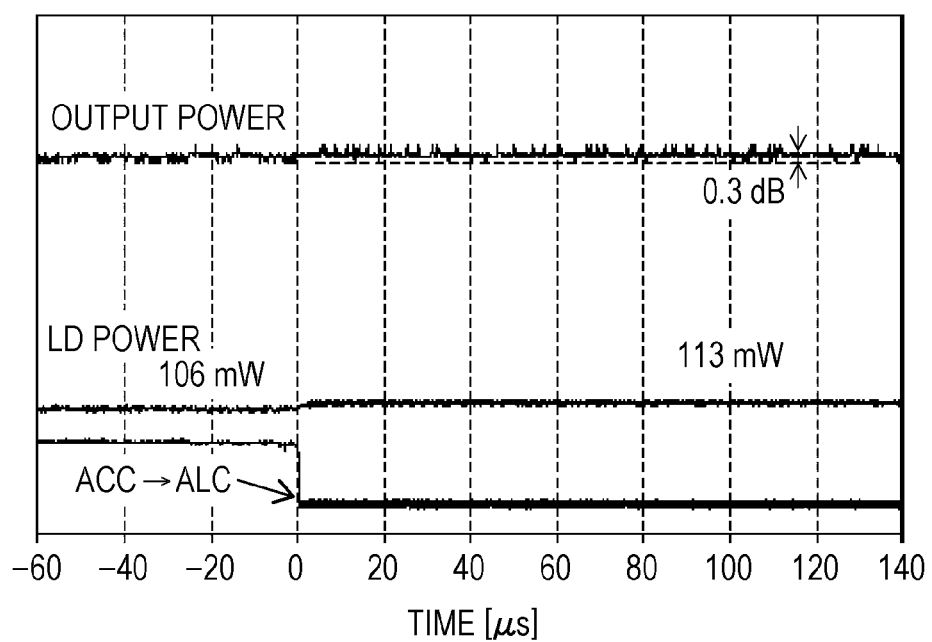
FIG. 11 is a diagram illustrating an example of a measurement result of a transient change illustrated in FIG. 10.

FIG. 11 illustrates an example of a measurement result of a transient change illustrated in FIG. 10. In FIG. 11, updating of the FPGA 40 is ended at time 0. During a period in which the updating of the FPGA 40 is in process, the pump light power is maintained at a particular value (106 mW in this specific example). After the updating process is ended, the ALC circuit 42 increases the pump light power to reduce the difference ΔP illustrated in FIG. 10 to zero. However, the control value generated by the ALC circuit 42 is limited by the limiter 44 within the range between the provisional upper limit value and the provisional lower limit value, and thus an abrupt increase in pump light power does not occur. More specifically, in the example illustrated in FIG. 11, although an increase occurs in pump light power from 106 mW to 113 mW, no surge of pump light occurs. The change in output power is as low as about 0.3 dB. As described above, in the optical amplifier 2A according to the first embodiment, the change in output power is suppressed compared with FIG. 4.

In the embodiment described above with reference to FIGS. 7 to 11, the provisional upper limit value is increased at a particular speed, and the provisional lower limit value is decreased at a particular speed. However, in the first embodiment, the operation scheme of the optical amplifier 2A is not limited to the example described above.

Figure 12:
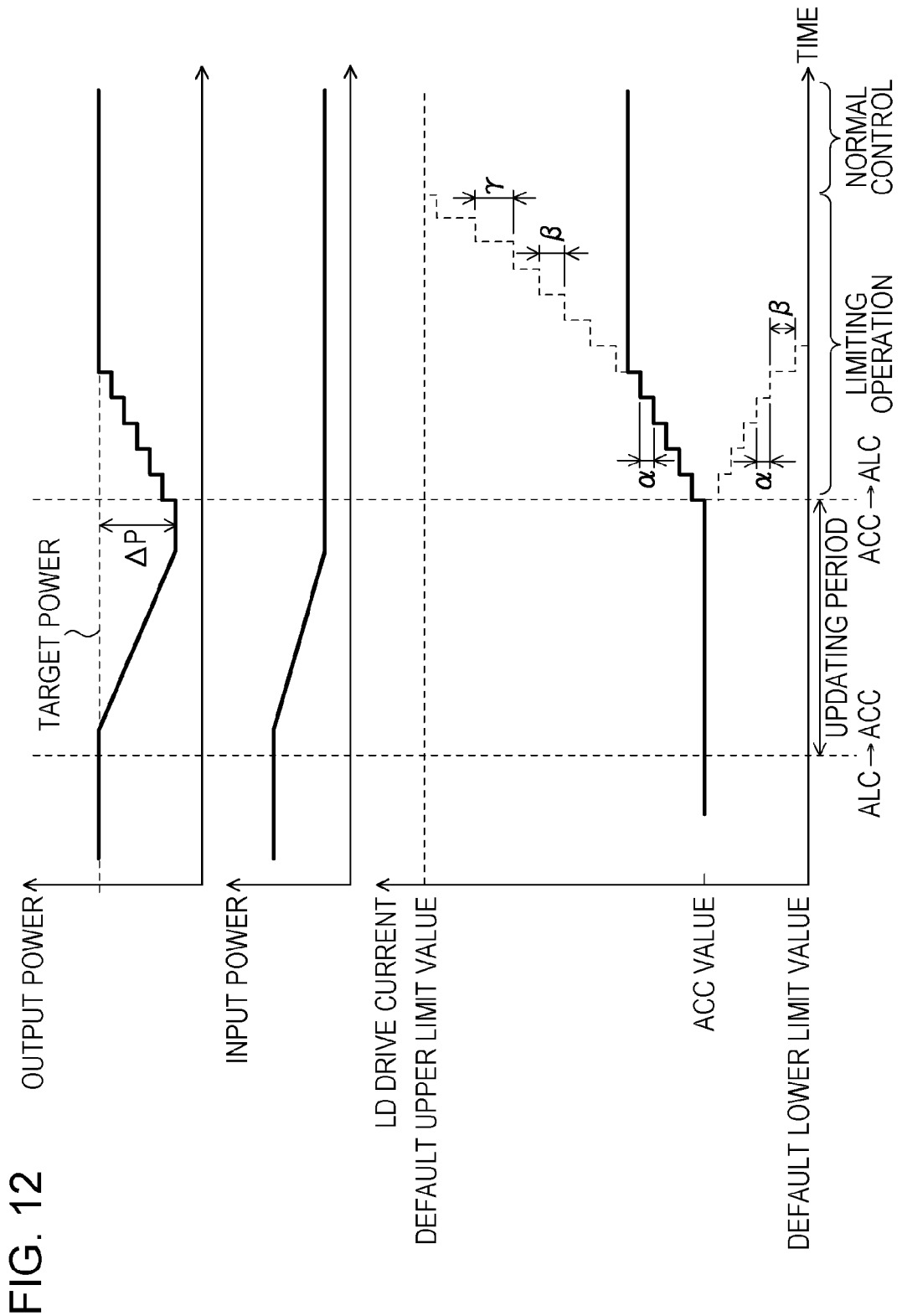
FIG. 12 is a diagram illustrating an example of an operation of an optical amplifier according to an embodiment.

For example, in the example illustrated in FIG. 12, the process of changing the provisional values (the provisional upper limit value and the provisional lower limit value) of the limiter 44 by α at a time is performed five times starting immediately after the FPGA 40 is restarted. Subsequently, the process of changing the provisional values by β at a time is performed five times. Thereafter, the process of changing the provisional values by γ at a time is performed. The parameters α, β, and γ are set, for example, such that α<β<γ. In this case, the speed at which to increase the provisional upper limit value is increased stepwise. The speed at which to reduce the provisional lower limit value is also increased stepwise. This scheme allows it to reduce the time taken to change the provisional values of the limiter 44 while suppressing surges of pump light and output light.

Figure 13:
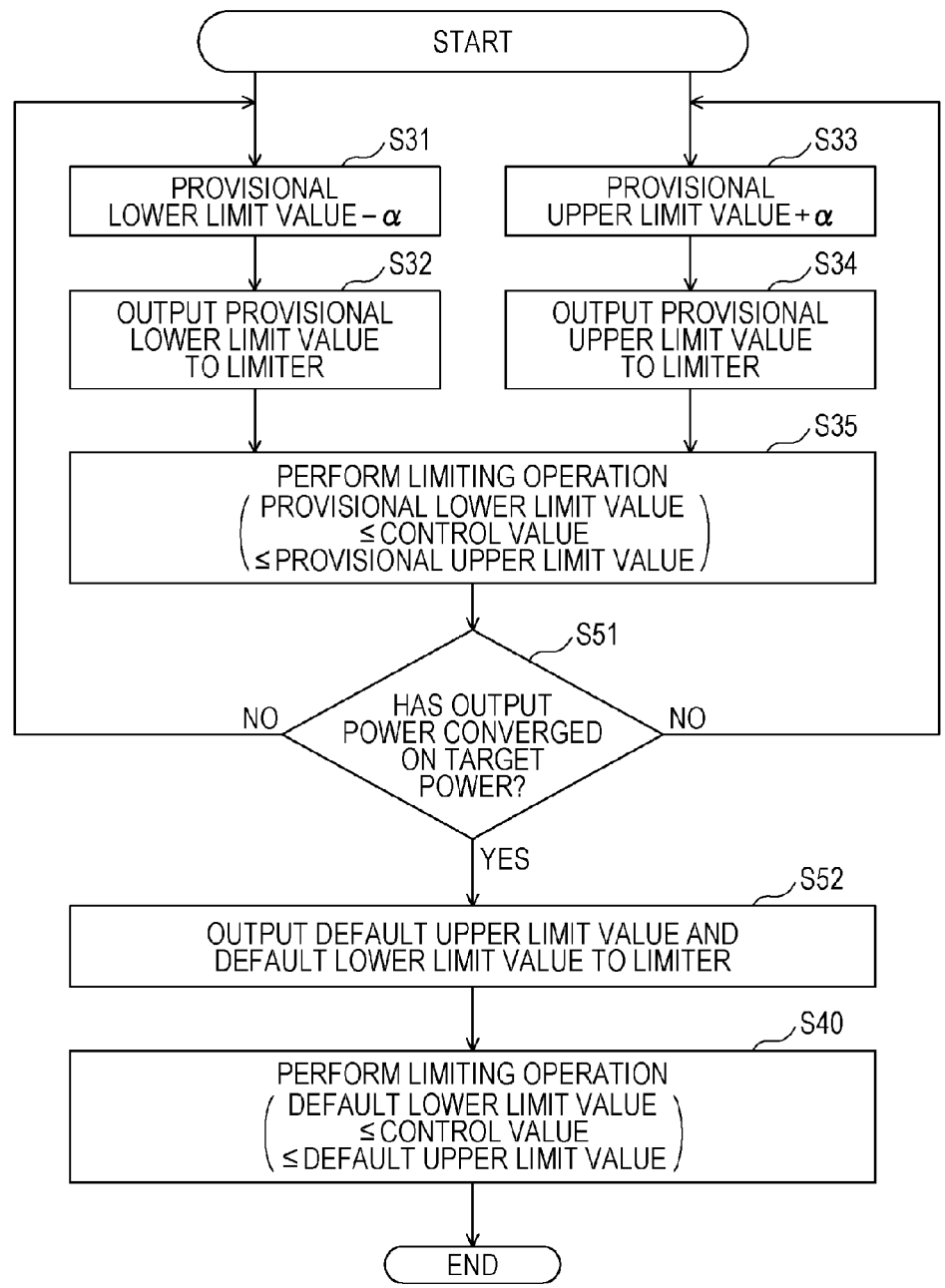
FIG. 13 is a flow chart illustrating an example of a limiter control process according to an embodiment.

FIG. 13 is a flow chart illustrating another example of a limiter control process according to the first embodiment. The limiter control process is performed in S8 in the flow chart illustrated in FIG. 6. That is, the limiter control process is performed after the FPGA 40 is restarted.

The process from S31 to S35 illustrated in FIG. 13 is similar to the process from S31 to S35 in the flow chart illustrated in FIG. 9. That is, the limiter controller 74 gradually decreases the provisional lower limit value and gradually increases the provisional upper limit value. As a result, the range of the control value limited by the limiter 44 gradually expands.

S51: The ALC circuit 42 determines whether the output power of the optical amplifier 2A has become sufficiently close to the target power. That is, a determination is performed as to whether the output power has converged to the target power. In a case where the output power has not yet converged to the target power, the flow of the limiter control process returns to S31 and S33. In this case, the process of reducing the provisional lower limit value and the process of increasing the provisional upper limit value are performed. That is, the process of reducing the provisional lower limit value and the process of increasing the provisional upper limit value are performed repeatedly until the output power has converged to the target power. When the output power has converged to the target power, the flow of the limiter control process proceeds to S52.

S52: The limiter controller 74 outputs the default lower limit value and the default upper limit value to the limiter 44.

Thereafter, in S40, the ALC circuit 42 generates a control value which leads to a reduction in the difference between the output power and the target power. The limiter 44 limits the generated control value such that the default lower limit value≤control value generated by the ALC circuit 42≤the default upper limit value.

Let it be assumed by way of example that the ACC value, the default lower limit value, and the default upper limit value are 300 mA, 0 mA, and 1000 mA, respectively, and the step size by which to change the provisional lower limit value and the provisional upper limit value is 20 mA. Furthermore, let it be assumed by way of example that the output power reaches the target power and converges thereon when the provisional lower limit value and the provisional upper limit value are respectively controlled to 220 mA and 380 mA. In this case, the limiter controller 74 ends the process of stepwise changing the provisional lower limit value and the provisional upper limit value, and sets the default lower limit value and the default upper limit value in the limiter 44.

Figure 14:
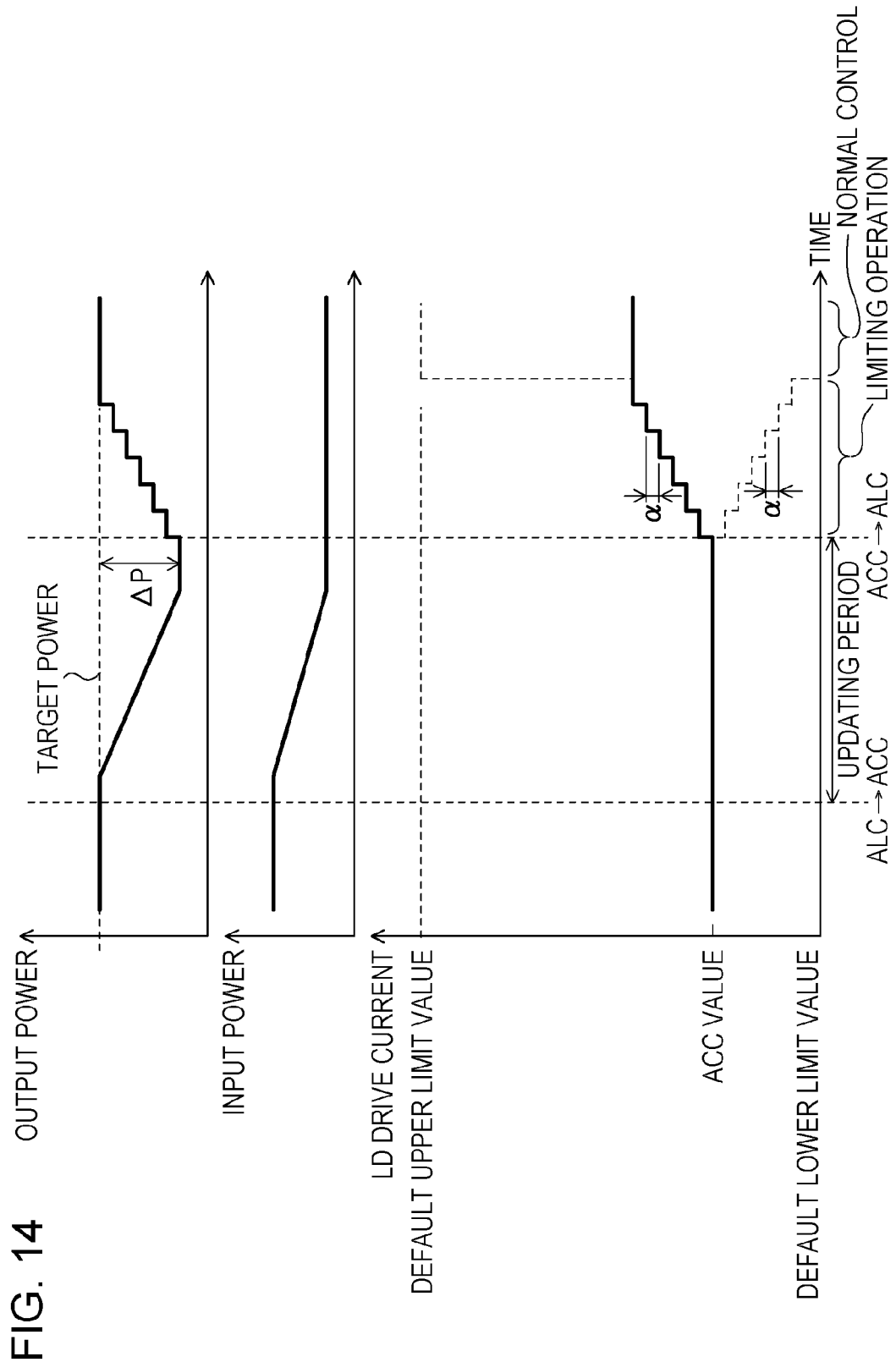
FIG. 14 is a diagram illustrating an operation of an optical amplifier when the limiter control process illustrated in FIG. 13 is performed.

FIG. 14 is a diagram illustrating an operation of the optical amplifier when the limiter control process illustrated in FIG. 13 is performed. In the example illustrated in FIG. 14, as in the example illustrated in FIG. 10, it is assumed that an increase in loss of an optical fiber of a transmission line occurs in the middle of the updating of the FPGA 40, and thus a reduction in input power occurs. As a result, at the end of the updating process, a difference ΔP occurs between the target power and the output power.

Also in this case, the initial value the provisional upper limit value and the initial value the provisional lower limit value are set to be equal to the ACC value. The limiter controller 74 increases the provisional upper limit value with a step size of α and decreases the provisional lower limit value with a step size of α. The pump light power gradually increases within the range limited by the provisional lower limit value and the provisional upper limit value. As a result, the output power of the optical amplifier 2A also gradually increases.

When the output power has reached and converged to the target power, the limiter controller 74 immediately sets the default lower limit value and the default upper limit value in the limiter 44 as illustrated in FIG. 14. In the operation after that, the control value generated by the ALC circuit 42 is limited by the limiter 44 within the range between the default lower limit value and the default upper limit value.

In the method of controlling the limiter illustrated in FIG. 13, as described above, when the output power has converged to the target power, the process of stepwise changing the provisional upper limit value and the provisional lower limit value is ended. Therefore, in the method illustrated in FIG. 13, compared with the method illustrated in FIG. 9, the operation mode of the optical amplifier 2A returns to the normal mode in a short time after the end of the updating of the FPGA 40.

In the first embodiment, as described above, in a period immediately following the restart of the FPGA 40, the range, within which the control value that control the pump light power is limited, is gradually expanded thereby suppressing a surge of pump light or output light. Suppressing the surge of pump light or output light may also be achieved by gradually changing the target power. Hereinafter, this method will be referred as a comparative method.

Figure 15:
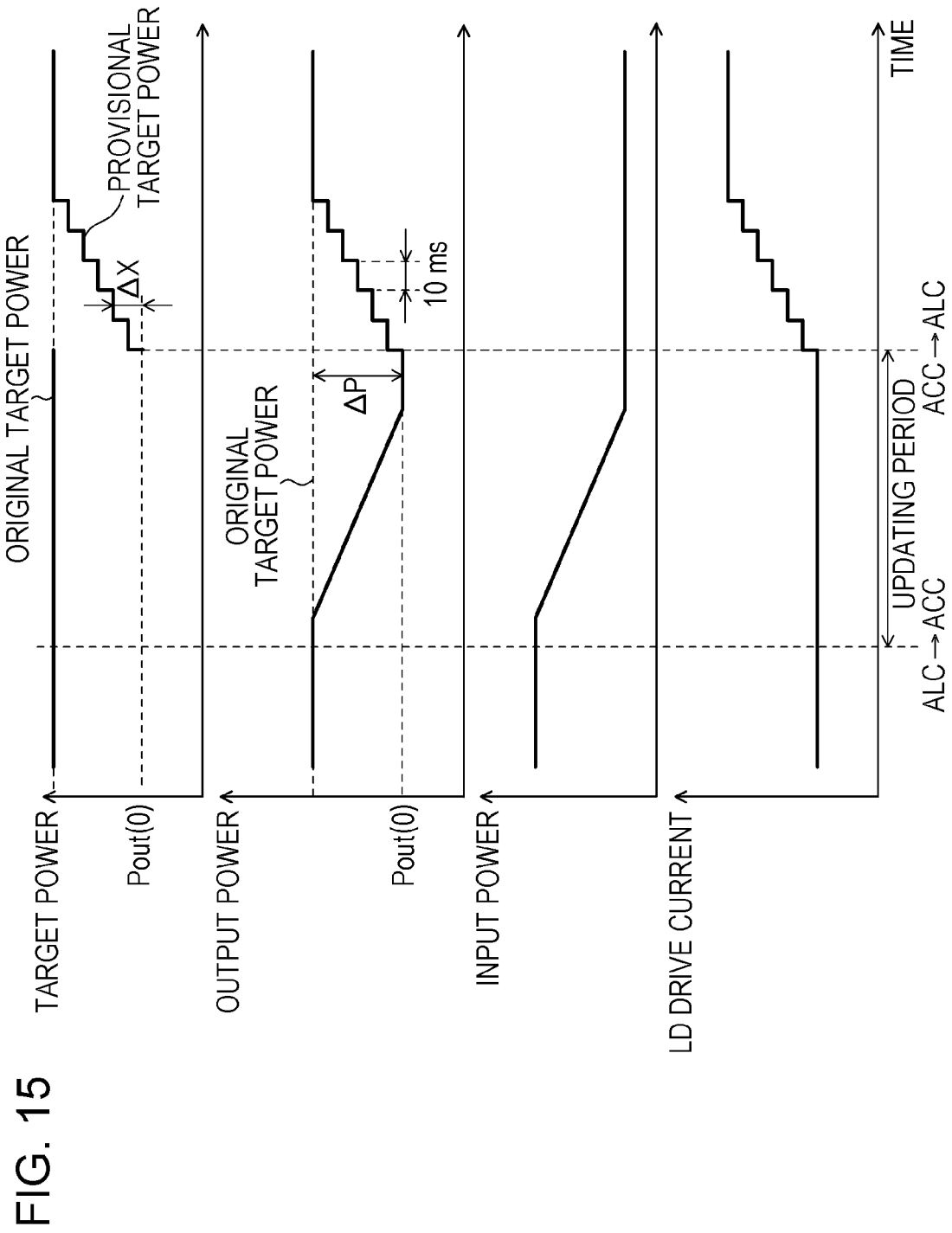
FIG. 15 is a diagram illustrating an operation of a comparative method.

In the comparative method, in a state immediately after the end of the updating of the FPGA, the pump light power is controlled using the provisional target power. The initial value of the provisional target power is set to be equal to output power Pout(0) at the point of time when the updating of the FPGA as illustrated in FIG. 15. In this state, there is no difference between the output power and the provisional target power, and thus no change in pump light power occurs.

Subsequently, the CPU gives a command to the FPGA to increase the provisional target power by Δx. In response, a control system increases the pump light power to decrease the difference between the output power and the newly set provisional target power. Thereafter, the process of changing the provisional target power by Δx at a time is performed repeatedly in a similar manner until the provisional target power reaches a true target power. To suppress a surge of pump light or output light, Δx may be set to be small. Therefore, in a case where the difference ΔP is large, the provisional target power is stepwise changed several to several ten times until the provisional target power reaches the true target power.

However, when the target power (the provisional target power in this case) is stepwise changed, it is desirable to set an ALC period to be greater enough compared with an EDF response time so that the control system does not have oscillation. For example, when the EDF response time is about 1 milliseconds, the ALC period may be set to about 10 milliseconds. In this case, each time the provisional target power is changed to a new value, it takes about 10 milliseconds to perform the ALC operation. Thus, it takes several ten to several hundred milliseconds for the provisional target power to reach the true target power. That is, although the comparative method is capable of reducing the surge of the pump light or the output light, it takes a long time for the optical amplifier to return to the normal operation mode after the FPGA is restarted.

In contrast, in the optical amplifier 2A according to the first embodiment, the range of the control value limited by the limiter 44 is changed without changing the target power, and thus the ALC period is not restricted by the response time of the EDF 10. Therefore, in the first embodiment, it is possible to reduce the time taken for the optical amplifier to return to the normal operation mode after the FPGA 40 is restarted. For example, in a case where the provisional upper limit value and the provisional lower limit value of the limiter 44 are changed to new values at intervals of 1 milliseconds, the optical amplifier 2A is capable of returning into the normal operation mode in 10 milliseconds or less.

In the description described above, it is assumed by way of example that immediately after the updating of the FPGA 40 is ended, the provisional upper limit value and the provisional lower limit value are both set to be equal to the ACC value as their initial value. However, the initial values are not limited to the ACC value. That is, the initial value of the provisional upper limit value may be set arbitrarily as long as it is lower than the upper limit value before the updating of the FPGA 40 is performed (that is, the default upper limit value). On the other hand, the initial value of the provisional lower limit value may be set arbitrarily as long as it is higher than the lower limit value before the updating of the FPGA 40 is performed (that is, the default lower limit value).

Furthermore, to suppress a fluctuation of the output power that may occur when the FPGA 40 is restarted, it is desirable to set both the provisional upper limit value and the provisional lower limit value. However, to suppress excessive output power, it may be allowed to stepwisely change only the provisional upper limit value in a manner as illustrated in FIG. 10, FIG. 12, or FIG. 14. In this case, when the FPGA 40 is restarted, the lower limit value of the limiter 44 may be immediately set to the default lower limit value (for example, zero).

Second Embodiment

Figure 16:
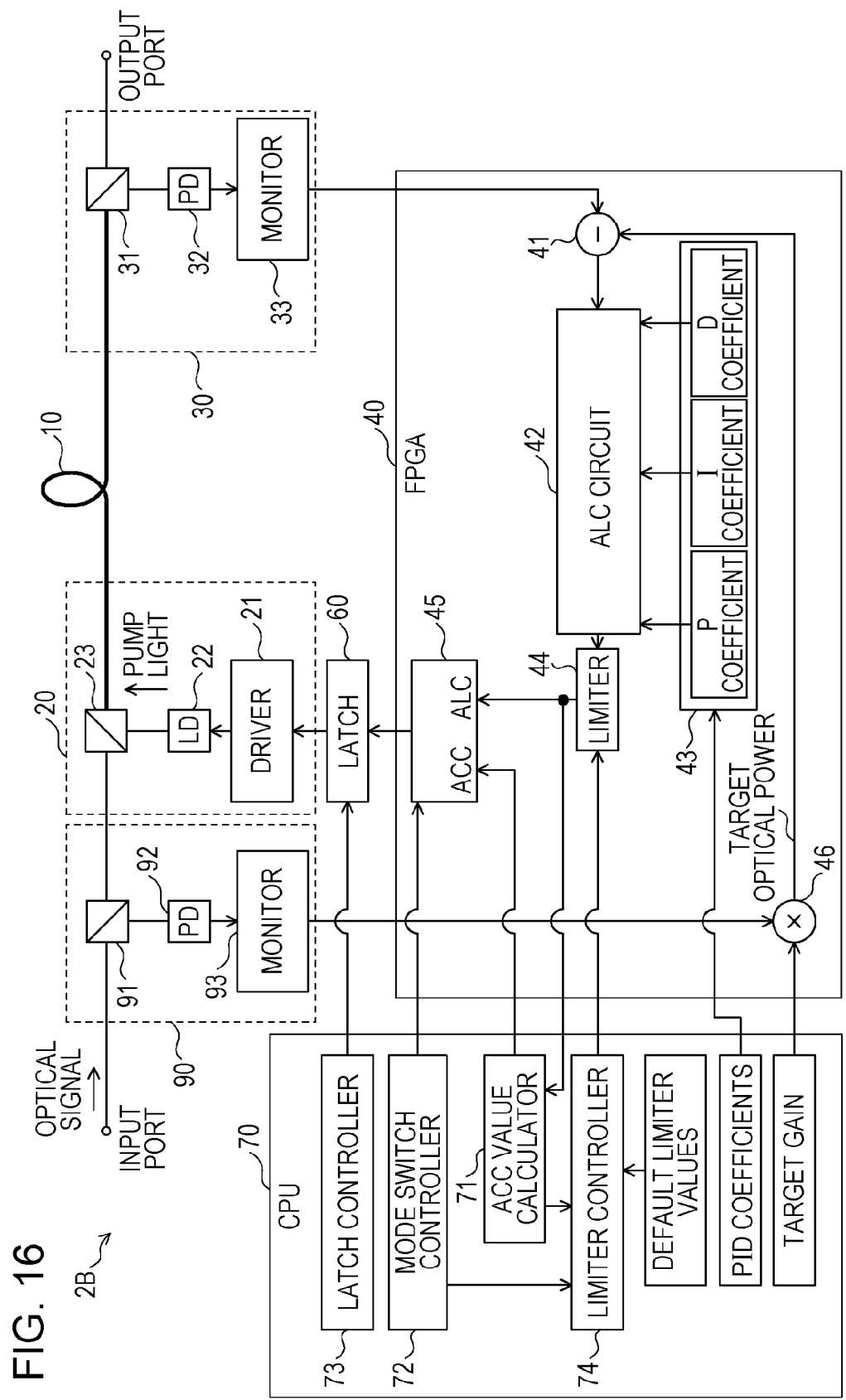
FIG. 16 is a diagram illustrating a configuration of an optical amplifier according to an embodiment.

FIG. 16 illustrates a configuration of an optical amplifier according to a second embodiment. The optical amplifier 2B according to the second embodiment, like the optical amplifier 2A illustrated in FIG. 5 according to the first embodiment, includes an EDF 10, a pump light generator 20, an output power detector 30, an FPGA 40, a latch circuit 60, and a CPU 70.

A difference between the optical amplifier 2B according to the second embodiment and the optical amplifier 2A according to the first embodiment is in the method of setting the target power. In the first embodiment, the target power is maintained at a particular value. In contrast, in the second embodiment, the target power is obtained based on the input power and a target gain. The CPU 70 receives the target gain, for example, from a controller (not illustrated) disposed outside the optical amplifier and configured to control the optical amplifier, and the CPU 70 gives the received target gain to the FPGA 40.

For the above purpose, the optical amplifier 2B includes an input power detector 90. The input power detector 90 includes a splitter 91, a photo detector 92, and a monitor 93. The splitter 91 splits an optical signal input to the optical amplifier 2B and directs the split optical signal to the photo detector 92. The photo detector 92 converts the optical signal received from the splitter 91 into an electric signal. The monitor 93 monitors the input power of the optical amplifier 2B based on the electric signal output from the photo detector 92.

The FPGA 40 includes a multiplier 46. The multiplier 46 multiplies the input power detected by the input power detector 90 by the target gain thereby calculating the target power. The target gain is given from the CPU 70 to the FPGA 40. Note that in the present embodiment, the target gain is maintained at a particular value without being changed. The subtractor 41 calculates the difference between the target power calculated by the multiplier 46 and the output power and outputs the resultant difference to the ALC circuit 42.

The process performed by the ALC circuit 42 to generate the control value based on the difference according to the second embodiment is similar to that according to the first embodiment except that the target power is calculated based on the target gain in the second embodiment. Thus, by performing the ALC operation according to the target power, it is possible to perform an automatic gain control (AGC) such that the gain of the EDF 10 becomes equal to the target gain.

In the second embodiment, the process of gradually expanding the range limited by the limiter 44 immediately after the updating of the FPGA 40 is ended is similar to that according to the first embodiment. Thus, also in the second embodiment, the surge of the output light is suppressed.

Third Embodiment

Figure 17:
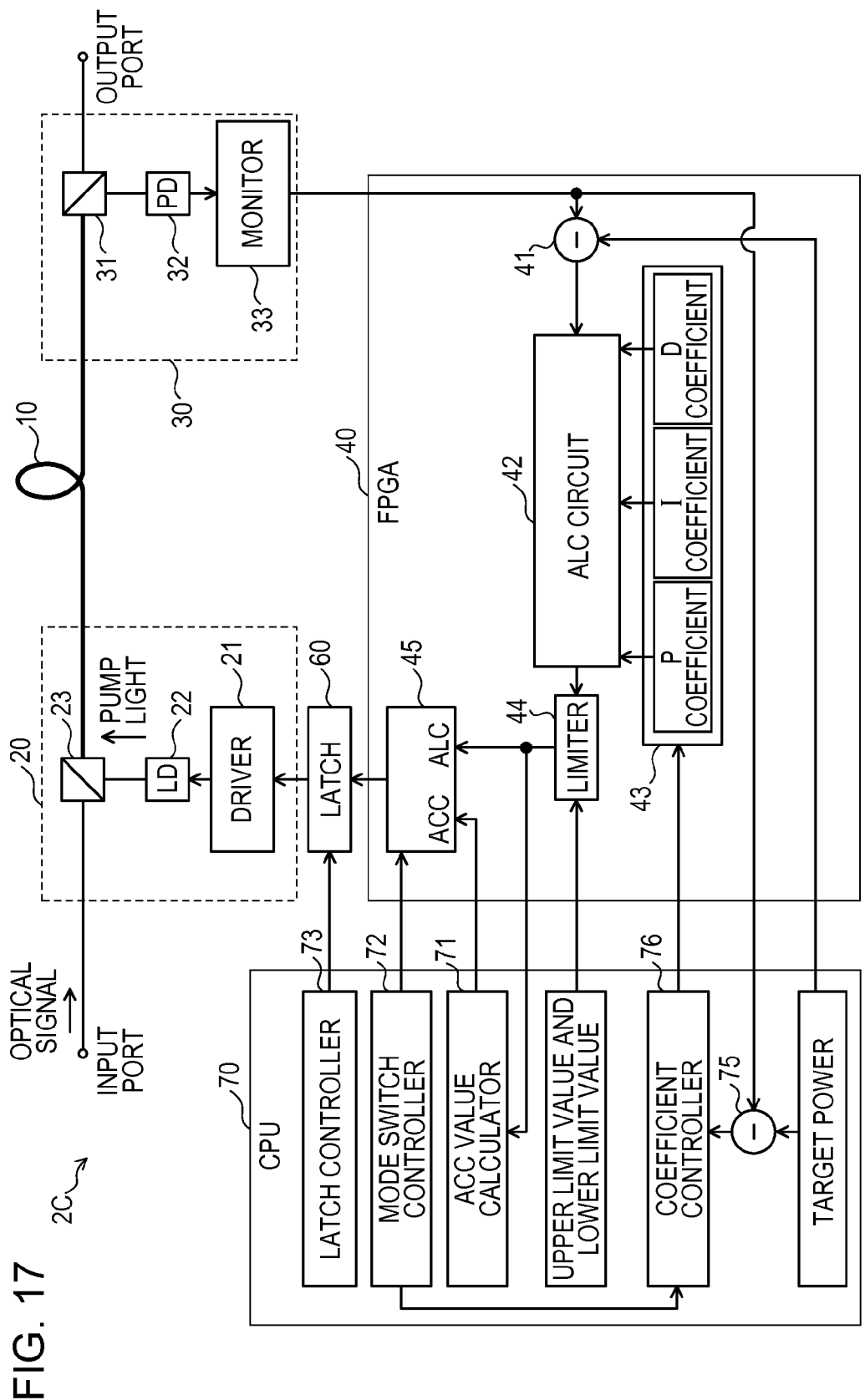
FIG. 17 is a diagram illustrating a configuration of an optical amplifier according to an embodiment.

FIG. 17 illustrates a configuration of an optical amplifier according to a third embodiment. The optical amplifier 2C according to the third embodiment, like the optical amplifier 2A illustrated in FIG. 5 according to the first embodiment, includes an EDF 10, a pump light generator 20, an output power detector 30, an FPGA 40, a latch circuit 60, and a CPU 70.

In the optical amplifier 2A according to the first embodiment described above, after the FPGA 40 is restarted, the range limited by the limiter 44 is gradually expanded to suppress surges of the pump light and the output light. In contrast, in the third embodiment, after the FPGA 40 is restarted, the coefficients used in the PID operation to generate the control value are controlled to suppress surges of the pump light and the output light.

In the third and third embodiments, the EDF 10, the pump light generator 20, the output power detector 30, the FPGA 40, and the latch circuit 60 are respectively configured in substantially similar manners to those according to the first embodiment. Thus, in the third embodiment, a description is omitted as to the EDF 10, the pump light generator 20, the output power detector 30, FPGA 40, and the latch circuit 60.

In the third embodiment, the CPU 70 includes an ACC value calculator 71, a mode switch controller 72, a latch controller 73, a subtractor 75, and a coefficient controller 76. In the third embodiment, the ACC value calculator 71, the mode switch controller 72, and the latch controller 73 are substantially similar to those according to the first embodiment.

The subtractor 75 calculates the difference between the output power detected by the output power detector 30 and the target power. The difference calculated by the subtractor 75 is substantially the same as the difference calculated by the subtractor 41. Therefore, for example, in a case where the difference calculated by the subtractor 41 is given to the CPU 70, the CPU 70 may not include the subtractor 75.

The coefficient controller 76 specifies the P coefficient, the I coefficient, and the D coefficient used by the ALC circuit 42 depending on the statue of the optical amplifier 2C. The ALC circuit 42 generates the control value by performing the PID operation described below.

Control value=P×difference+I×integrated value of difference+D×derivative value of difference where P, I, and D are respectively the P coefficient (the proportional coefficient), the I coefficient (the coefficient of the integral term), and the D coefficient (the coefficient of the derivative term).

For example, when the updating of the FPGA 40 is ended, if the difference between the output power and the target power is greater than a predetermined threshold value, then the coefficient controller 76 reduces the I coefficient compared with that in the normal operation mode. For example, the coefficient controller 76 may set the I coefficient to zero. When the I coefficient is equal to zero, the integral operation in the PID control is not performed. In this case, the control value is calculated according to a formula described below.

control value=*P*×difference+*D*×derivative value of difference

The reason why the I coefficient is set to be small is as follows. The ALC circuit 42 generates the control value by the PID control so as to reduce the difference between the output power and the target power. In this process, in the integral operation, the cumulative value of the difference is determined. Therefore, when the difference between the output power and the target power is large, an abrupt change occurs in the control value generated by the ALC circuit 42. In this case, an abrupt change also occurs in the power of the pump light generated according to the control value, and thus a surge of output light occurs. Therefore, by setting the I coefficient to be small thereby reducing the effect of the integral term in the PID control, it is possible to suppress the surge of the output light.

Next, a description is given below as to an operation of the optical amplifier 2C in the updating of the FPGA 40 according to the third embodiment. When the FPGA 40 is updated, the optical amplifier 2C performs the process from S1 to S6 in the flow chart illustrated in FIG. 6 in a similar manner to the first embodiment. However, in the third embodiment, instead of S7 to S8 in FIG. 6, a FPGA restart process is performed as described below.

Figure 18:
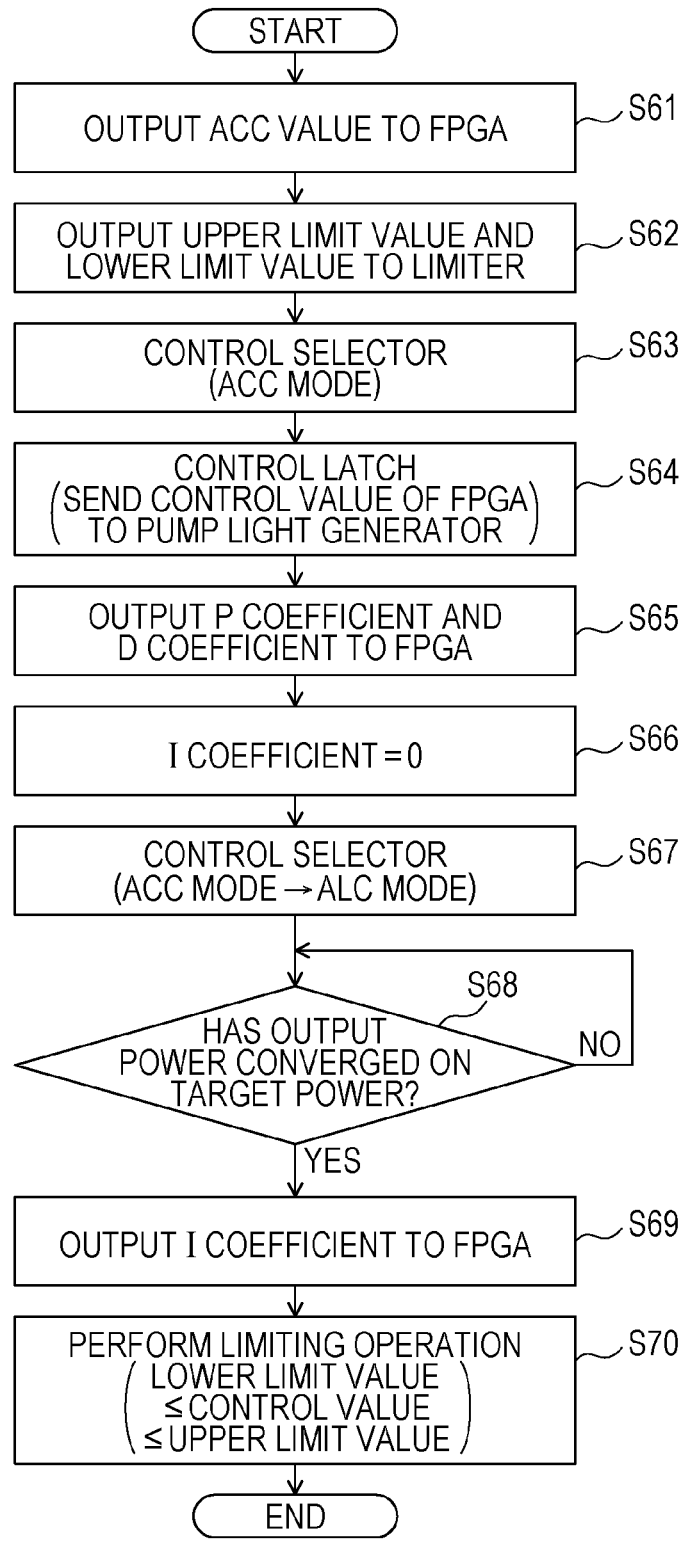
FIG. 18 is a flow chart illustrating a process of restarting an FPGA according to an embodiment.

FIG. 18 is a flow chart illustrating the FPGA restart process according to the third embodiment. This FPGA restart process is performed after S6 in the flow chart illustrated in FIG. 6. That is, the FPGA restart process is performed when the updating of the FPGA 40 is ended.

S61: The CPU 70 outputs the ACC value to the FPGA 40. In the FPGA 40, this ACC value is given to the selector 45. Note that, as in the first embodiment, the CPU 70 calculates the ACC value and holds it immediately before the updating of the FPGA 40 is started.

S62: The CPU 70 outputs, to the limiter 44, the upper limit value and the lower limit value for limiting the control value generated by the ALC circuit 42. In the operation after that, the limiter 44 limits the control value generated by the ALC circuit 42 using the given upper limit value and lower limit value. Note that as for the upper limit value and the lower limit value given to limiter 44 in S62, for example, the default upper limit value and the default lower limit value according to the first embodiment may be employed.

S63: The mode switch controller 72 in the CPU 70 sets the operation mode of the optical amplifier 2C to the ACC mode. For this purpose, the mode switch controller 72 gives a selection command to the selector 45 to select the ACC value. In response to the selection command, the selector 45 selects the ACC value given in S61 and outputs the selected ACC value to the latch circuit 60.

S64: The latch controller 73 in the CPU 70 controls the latch circuit 60 to release the latched value. Thus, in the operation thereafter, a signal output from the FPGA 40 is passed through the latch circuit 60 and is given to the pump light generator 20. Note that at this point of time, the FPGA 40 outputs the ACC value. Therefore, the ACC value is given to the pump light generator 20.

S65: The coefficient controller 76 of the CPU 70 outputs the P coefficient and the D coefficient to the FPGA 40. In the present embodiment, the P coefficient and the D coefficient are respectively maintained at particular values. That is, the P coefficient and the D coefficient given to the FPGA 40 in S65 are the same as the P coefficient and the D coefficient used by the ALC circuit 42 before the execution of the updating of FPGA 40.

S66: The coefficient controller 76 gives the I coefficient=0 to the FPGA 40. Therefore, in the operation thereafter, the ALC circuit 42 generates the control value by the proportional operation and the derivative operation without performing the integral operation.

S67: The mode switch controller 72 in the CPU 70 returns the operation mode of the optical amplifier 2C form the ACC mode to the ALC mode. For this purpose, the mode switch controller 72 gives a selection command to the selector 45 to select the control value generated by the ALC circuit 42. In response to the selection command, the selector 45 selects the control value generated by the ALC circuit 42 and outputs the selected ACC value to the latch circuit 60. In the operation after that, the optical amplifier 2C generates the control value using the closed loop control to control the pump light power.

S68: The coefficient controller 76 monitors the output power of the optical amplifier 2C to determine whether the output power of the optical amplifier 2C converges to the target power. In this process, the coefficient controller 76 determines whether the difference, calculated by the subtractor 75, between the output power and the target power has becomes sufficiently small. If the difference is sufficiently small, then the process associated with the coefficient controller 76 proceeds to S69.

S69: The coefficient controller 76 outputs the I coefficient to the FPGA 40. In the present embodiment, the I coefficient is maintained at a particular value without being changed. That is, the I coefficient given to the FPGA 40 in S69 is the same as the I coefficient used by the ALC circuit 42 before the execution of the updating of the FPGA 40. Thus, in the operation thereafter, the ALC circuit 42 generates the control value to control the pump light power using the same PID control parameters as those used before the execution of the updating.

S70: By using the PID control with the coefficients given from the CPU 70 in S65 and S69, the ALC circuit 42 generates a control value which leads to a reduction in the difference between the output power and the target power. The limiter 44 limits the control value such that the lower limit value≤control value generated by the ALC circuit 42≤the upper limit value. Therefore, the control value given to the pump light generator 20 falls within a range between the lower limit value and the upper limit value.

In the third embodiment, as described above, in the operation immediately after the FPGA 40 is restated, the integral operation is not performed in the PID operation in generating the control value to control the pump light power. Therefore, even if the difference between the output power and the target power is large when the FPGA 40 is restarted, the difference is not cumulated in the operation performed by the ALC circuit 42. Therefore, an abrupt change in the control value does not occur, and surges of the pump light and the output light are suppressed.

Figure 19:
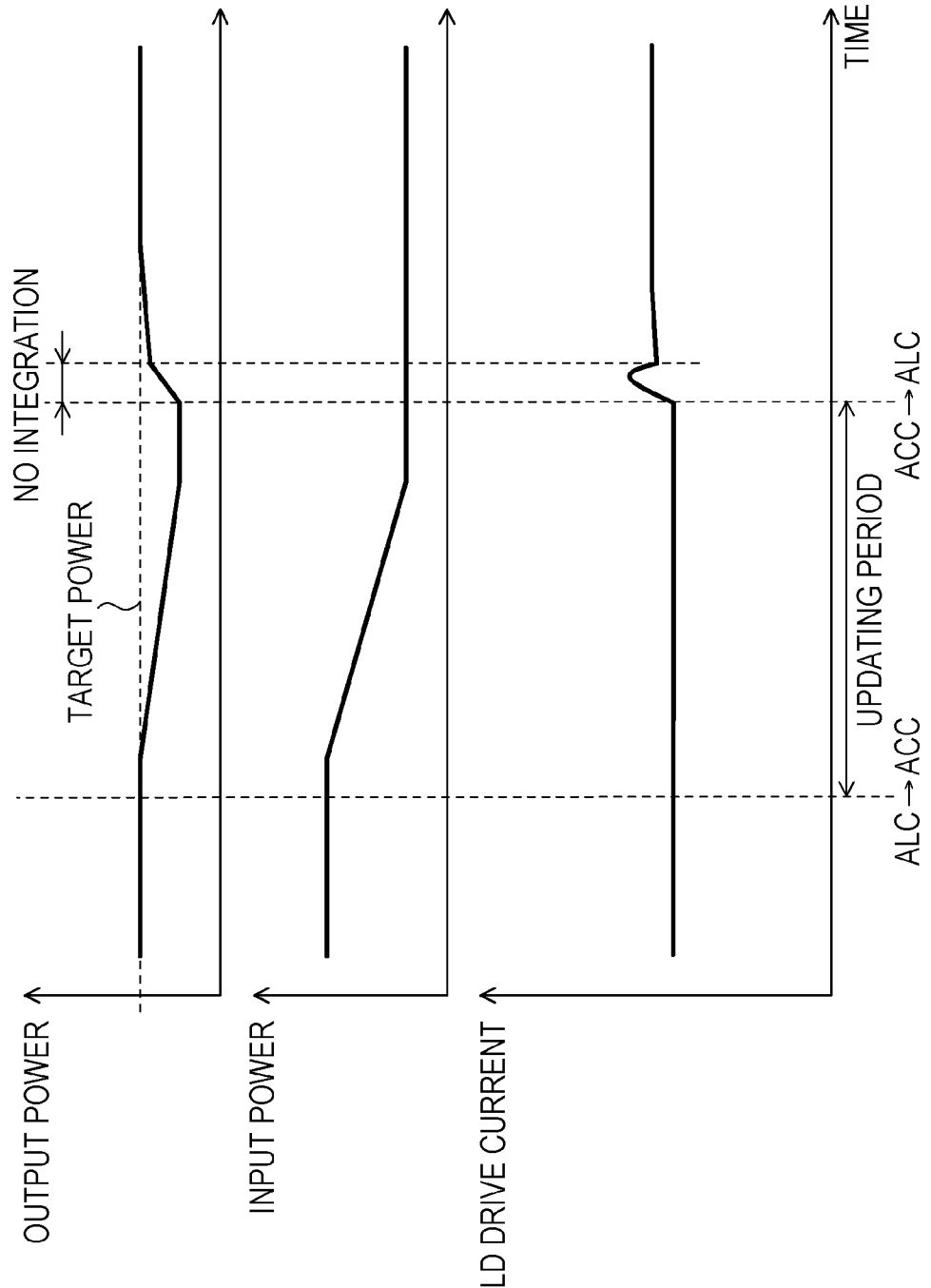
FIG. 19 is a diagram illustrating an example of an operation of an optical amplifier according to an embodiment.

FIG. 19 illustrates an example of an operation of the optical amplifier according to the third embodiment when updating is performed. In the example illustrated in FIG. 19, as in the example illustrated in FIG. 3 or FIG. 10, it is assumed that an increase in loss of an optical fiber of a transmission line occurs in the middle of the updating of the FPGA 40, and thus a reduction in input power occurs. As a result, at the end of the updating process, a difference ΔP occurs between the target power and the output power.

When the FPGA 40 is restarted, the ALC circuit 42 generates the control value so as to reduce the difference ΔP. However, in the optical amplifier 2C according to the third embodiment, the integral operation in the PID control is temporarily stopped during a period until the difference between the target power and the output power decreases to a sufficiently small value. That is, the ALC circuit 42 generates the control value only via the proportional operation and the derivative operation. Therefore, the control value generated by the ALC circuit 42 gradually changes. As a result, surges of the pump light and the output light are suppressed.

Figure 20:
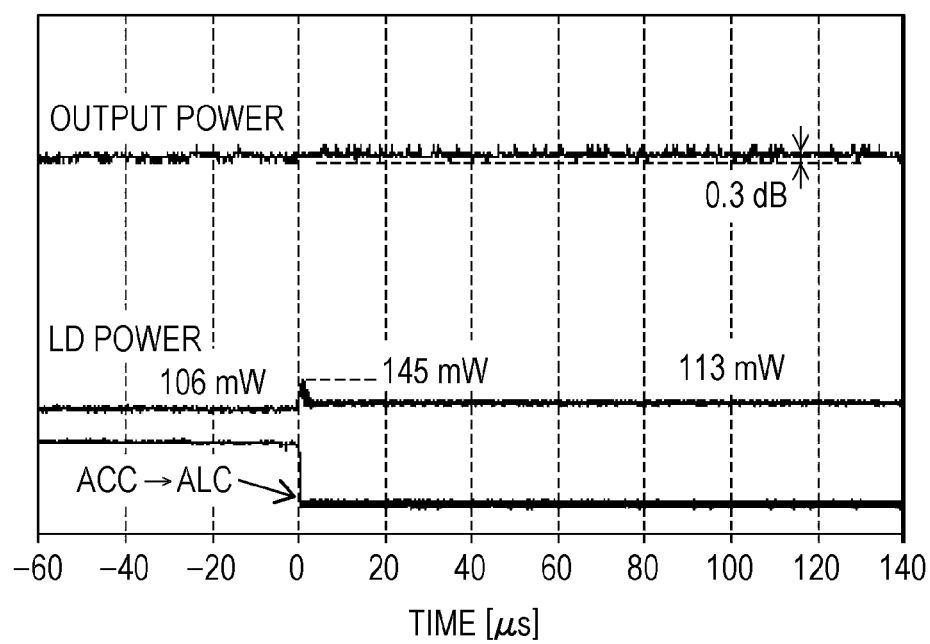
FIG. 20 is a diagram illustrating an example of a measurement result of a transient change illustrated in FIG. 19.

FIG. 20 is a diagram illustrating an example of a measurement result of a transient change illustrated in FIG. 19. In FIG. 20, updating of the FPGA 40 is ended at time 0. During a period in which the updating of the FPGA 40 is in process, the pump light power is maintained at a particular value (106 mW in this specific example). When the updating process is ended, the ALC circuit 42 tries to increase the pump light power to reduce the difference ΔP illustrated in FIG. 19 to zero. However, the integral operation in the PID control by the ALC circuit 42 is stopped. Therefore, an abrupt increase in pump light power does not occur. In the present example, as illustrated in FIG. 20, although the pump light power temporarily increases up to 145 mW, a surge of pump light is suppressed compressed compared with the case illustrated in FIG. 3. Note that the change in output power is as low as about 0.3 dB.

In the optical amplifier 2C according to the third embodiment, as described above, the change in output power is suppressed compared with the case illustrated in FIG. 4.

In the example described above, the integral operation in the PID control is stopped immediately after the FPGA 40 is restarted. However, the operation according to the second embodiment is not limited to this example. That is, immediately after the FPGA 40 is restarted, the coefficient controller 76 may reduce the I coefficient in the integral operation to a value smaller than is used in a normal operation. That is, the coefficient controller 76 may not set the I coefficient to zero in S66. When the I coefficient is small, the effect of the integral term in the PID control is small, which suppresses a fluctuation of the control value that controls the pump light power based on the cumulative difference.

Figure 21:
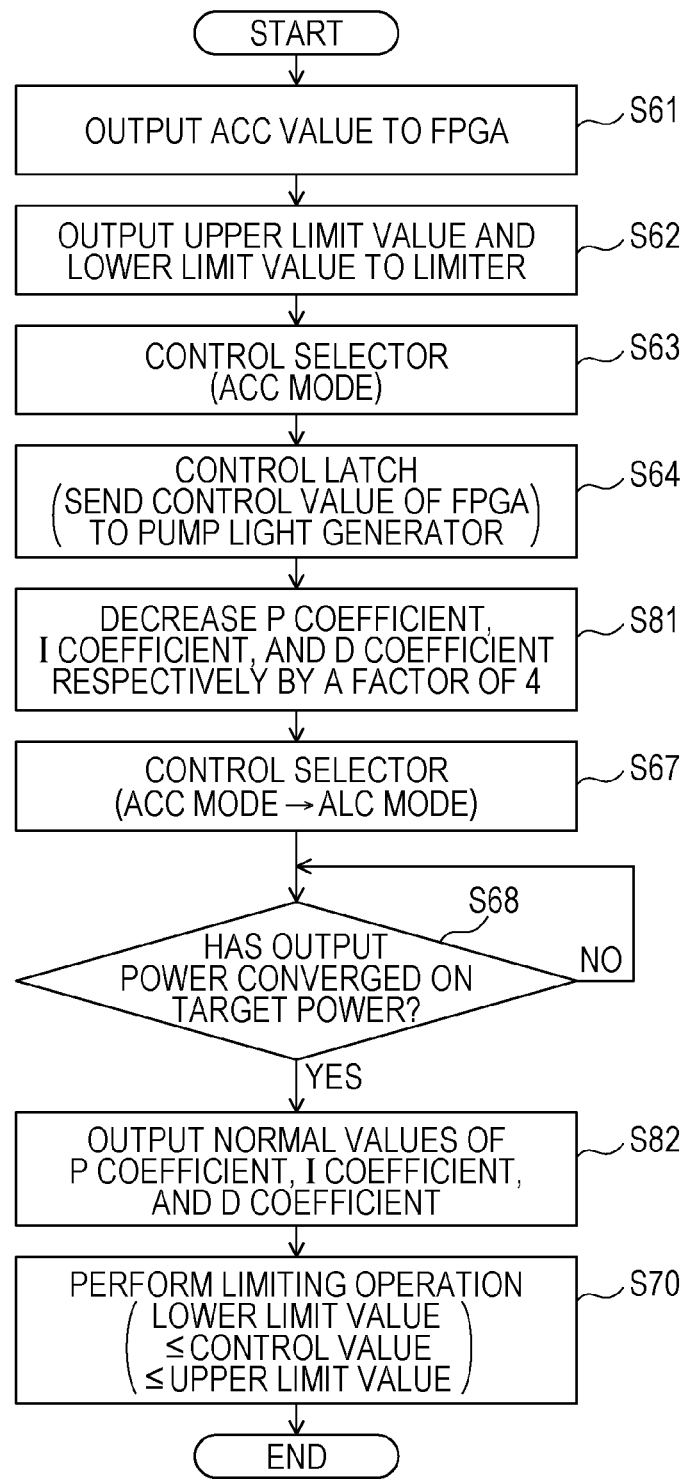
FIG. 21 is a flow chart illustrating a process of restarting an FPGA according to an embodiment.

Alternatively, immediately after the FPGA 40 is restarted, not only the I coefficient but also other coefficients may be reduced to values smaller than are used in the normal operation. FIG. 21 illustrates a method of suppressing a surge by temporarily reducing the coefficients in the PID control. In FIG. 21, S61 to S64, S67, S68, and S70 are similar to those illustrated in FIG. 18 described above, and thus a further description thereof is omitted.

S81: The coefficient controller 76 of the CPU 70 outputs to the FPGA 40 values which are respectively one fourth the P coefficient, the I coefficient, and the D coefficient used in the normal operation. That is, the "P coefficient/4", the "I coefficient/4", and the "D coefficient/4" are given to the FPGA 40. Thus, in the operation immediately after the FPGA 40, the ALC circuit 42 generates the control value by performing the PID operation using the "P coefficient/4", the "I coefficient/4", and the "D coefficient/4" instead of the P coefficient, the I coefficient, and the D coefficient used in the normal operation.

S82: The operation in S82 is performed when it is determined in S68 that the difference between the output power and the target power is sufficiently small. In S82, the coefficient controller 76 outputs the P coefficient, the I coefficient, and the D coefficient all having values used in the normal operation to the FPGA 40. Therefore, in the operation thereafter, the ALC circuit 42 generates the control value using the same PID parameters as those to those used before the updating of the FPGA 40, and the limiter 44 limits the control value to the range between the specified upper limit value and the lower limit value.

In the above-described operation of the ALC circuit 42, the control value is generated by performing the PID control. However, the third embodiment is not limited to this operation scheme. For example, the ALC circuit may generate the control value using PI control. In this case, after the FPGA 40 is restarted, the ALC circuit 42 generates the control value using, temporarily, only a proportional operation. Thereafter, when the difference between the output power and the target power becomes sufficiently small, the ALC circuit 42 returns into the normal operation in which the control value is generated using the PI control.

Fourth Embodiment

Figure 22:
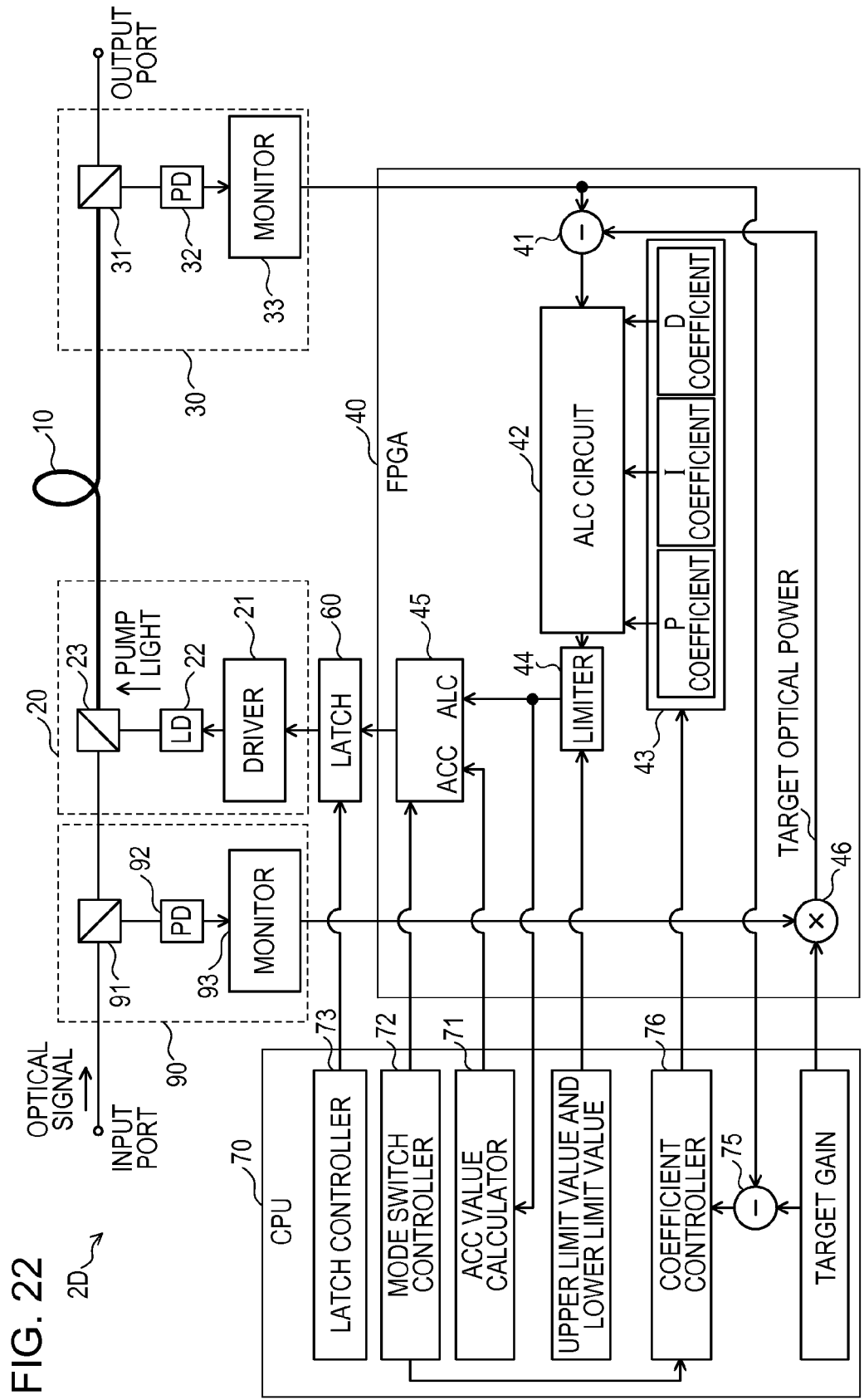
FIG. 22 is a diagram illustrating a configuration of an optical amplifier according to an embodiment.

FIG. 22 illustrates a configuration of an optical amplifier according to a fourth embodiment. The optical amplifier 2D according to the fourth embodiment, like the optical amplifier 2C illustrated in FIG. 17 according to the third embodiment, includes an EDF 10, a pump light generator 20, an output power detector 30, an FPGA 40, a latch circuit 60, and a CPU 70.

A difference between the optical amplifier 2D according to the fourth embodiment and the optical amplifier 2C according to the third embodiment is in the method of setting the target power. In the third embodiment described above, the target power is maintained at a particular value without being changed. In contrast, in the fourth embodiment, the target power is obtained based on the input power and the target gain.

For the above purpose, as with the optical amplifier 2B according to the second embodiment, the optical amplifier 2D includes an input power detector 90. The configuration and the operation of the input power detector 90 are substantially similar to those according to the second embodiment, and a further description thereof is omitted. The FPGA 40 of the optical amplifier 2D includes, as in the second embodiment, a multiplier 46. The multiplier 40 multiplies input power by a target gain thereby calculating the target power. The subtractor 41 calculates the difference between the target power calculated by the multiplier 46 and the output power and outputs the resultant difference to the ALC circuit 42.

In the fourth embodiment, the process performed by the ALC circuit 42 to generate the control value based on the difference is similar to that according to the third embodiment. However, in the fourth embodiment, the target power is calculated based on the target gain. That is, by performing the ALC operation according to the target power, it is possible to perform an automatic gain control (AGC) such that the gain of the EDF 10 becomes equal to the target gain.

In the fourth embodiment, the process of temporarily reduce the coefficients in the PID operation immediately after the updating of the FPGA 40 is ended is similar to that according to the third embodiment. Thus, the fourth embodiment is also possible of suppressing surges of pump light and output light.

Advantageous Effects of Embodiments

In the optical amplifier according to each embodiment described above, in the operation immediately after the updating of the FPGA is ended, the ACC value having a value used before the updating is performed is given to the pump light generator. The upper limit value and the lower limit value of the limiter by which the control value is limited are renewed stepwise so as to gradually go away from the ACC value. Therefore, a fluctuation of the control value is small that may occur immediately after the control mode is switched from the ACC mode to the ALC mode when the FPGA is restarted, and thus a transient change in pump light power is suppressed.

The suppression of the transient change in pump light power leads to suppression of the transient change in power of an optical signal amplified by the optical amplifier. As a result, in a receiver, a low fluctuation of received optical power is achieved and a reception error rate is improved. That is, it is possible to update functions of the optical amplifier without stopping service of an optical transmission system and without causing degradation of transmission quality.

In the embodiments described above, the optical amplifier is configured such that the limiter range of control value output to the pump light generator is expanded stepwise via the iteration of steps, and thus the operation time per step is not restricted by the EDF response time. Therefore, after the updating, the output power converges to the target power in a short time.

In alternative embodiments, the optical amplifier is configured such that at the point of time immediately after the updating of the FPGA is ended, parameters are changed so as to reduce the coefficient of the integral term in the PI operation or the PID operation to generate the control value. This results in a reduction in the effect of the cumulative sum of the difference between the output power and the target power, and thus an abrupt change in the control value is suppressed. Thus, also in this configuration, a transient change of pump light power is suppressed.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical amplifier comprising:
an optical amplification medium;
a pump light generator configured to generate pump light with a power corresponding to a set control value and supply the generated pump light to the optical amplification medium;
a first controller including a level control circuit configured to generate the control value such that an output power of the optical amplification medium approaches a target power, and a limiter configured to limit a range of the control value;
a latch circuit configured to set a specific control value to the pump light generator during a period in which the first controller is in a stop state;
a limiter controller configured to control the limiter, when the first controller is restarted, so that the limiter limits the control value such that an upper limit value of the control value is set to be smaller than a value used before the first controller was stopped, and control the limiter, when the first controller is restarted, so that the limiter limits the control value such that a lower limit value of the control value is set to be higher than a value used before the first controller was stopped.

2. The optical amplifier according to claim 1, wherein the limiter controller is configured to operate, when the first controller is restarted, such that the limiter controller sets the upper limit value and the lower limit value to be equal to the control value set from the first controller to the pump light generator before the first controller is stopped, and thereafter the limiter controller increases the upper limit value and reduces the lower limit value.

3. The optical amplifier according to claim 2, wherein the limiter controller increases stepwise a speed at which the upper limit value is increased, and increases stepwise a speed at which the lower limit value is reduced.

4. The optical amplifier according to claim 2, wherein when a difference between output power of the optical amplification medium and the target power becomes smaller than a predetermined value, the limiter controller sets the upper limit value to a value corresponding to maximum pump light power of the pump light generator and sets the lower limit value to a value corresponding to minimum pump light power of the pump light generator.

5. The optical amplifier according to claim 1, further comprising:
a detector configured to detect input power of the optical amplification medium; and
a target power calculator configured to calculate the target power based on the input power detected by the detector and a target gain specified beforehand,
wherein the level control circuit is configured to generate the control value such that the output power of the optical amplification medium approaches the target power calculated by the target power calculator.

6. An optical amplifier comprising:
an optical amplification medium;
a pump light generator configured to generate pump light with a power corresponding to a set control value and supply the generated pump light to the optical amplification medium;
a first controller configured to generate the control value using proportional-integral (PI) control or proportional-integral-derivative (PID) control such that an output power of the optical amplification medium approaches a target power;
a latch circuit configured to set a specific control value to the pump light generator during a period in which the first controller is in a stop state; and
an operation controller configured to, when the first controller is restarted, reduce a coefficient of an integral term in the PI control or the PID control to a value smaller than a value used before the first controller was stopped.

7. The optical amplifier according to claim 6, wherein when the first controller is restarted, the operation controller stops the integral operation in the PI control or the PID control.

8. The optical amplifier according to claim 6, wherein the operation controller is configured such that after the first controller is restarted, when a difference between output power of the optical amplification medium and the target power becomes smaller than a predetermined value, the operation controller returns the coefficient of the integral term to a value of the coefficient of the integral term used before the first controller was stopped.

9. The optical amplifier according to claim 6, wherein the operation controller is configured such that when the first controller is restarted, the operation controller sets coefficients of respective terms in the PI control or the PID control to values smaller than values used before the first controller was stopped, and when a difference between output power of the optical amplification medium and the target power becomes smaller than a predetermined value, the operation controller returns the coefficients of the respective terms in the PI control or the PID control to the values used before the first controller was stopped.

10. The optical amplifier according to claim 6, further comprising:
a detector configured to detect input power of the optical amplification medium; and
a target power calculator configured to calculate the target power based on the input power detected by the detector and a target gain specified beforehand,
wherein the first controller generates the control value such that output power of the optical amplification medium approaches the target power calculated by the target power calculator.

* * * * *